(12) United States Patent
Thurston et al.

(10) Patent No.: US 11,391,626 B2
(45) Date of Patent: Jul. 19, 2022

(54) INTEGRATED PHOTODETECTOR WITH CHARGE STORAGE BIN OF VARIED DETECTION TIME

(71) Applicant: Quantum-Si Incorporated, Guilford, CT (US)

(72) Inventors: Tom Thurston, Guilford, CT (US); Benjamin Cipriany, Branford, CT (US); Joseph D. Clark, Litchfield, NH (US); Todd Rearick, Cheshire, CT (US); Keith G. Fife, Palo Alto, CA (US)

(73) Assignee: Quantum-Si Incorporated, Guilford, CT (US)

( * ) Notice: Subject to any disclaimer, the term of this patent is extended or adjusted under 35 U.S.C. 154(b) by 113 days.

(21) Appl. No.: 16/446,708

(22) Filed: Jun. 20, 2019

(65) Prior Publication Data
US 2019/0391010 A1 Dec. 26, 2019

Related U.S. Application Data

(60) Provisional application No. 62/688,669, filed on Jun. 22, 2018.

(51) Int. Cl.
*G01J 1/44* (2006.01)
*H04N 5/3745* (2011.01)
(Continued)

(52) U.S. Cl.
CPC .......... *G01J 1/44* (2013.01); *G01N 21/6408* (2013.01); *G01N 21/6458* (2013.01);
(Continued)

(58) Field of Classification Search
CPC .. G01J 1/44; G01J 2001/446; G01J 2001/448; G01N 21/6428;
(Continued)

(56) References Cited

U.S. PATENT DOCUMENTS

| | | | |
|---|---|---|---|
| 5,198,543 | A | 3/1993 | Blanco et al. |
| 5,302,509 | A | 4/1994 | Cheeseman |

(Continued)

FOREIGN PATENT DOCUMENTS

| | | |
|---|---|---|
| CN | 2433618 Y | 6/2001 |
| CN | 1364940 A | 8/2002 |

(Continued)

OTHER PUBLICATIONS

Hale, Fibre Optic Sensors using Adiabatically Tapered Single Mode Fibres. Dissertation submitted to the University of Cambridge. Feb. 1994. 209 pages.

(Continued)

*Primary Examiner* — Jennifer D Bennett
(74) *Attorney, Agent, or Firm* — Wolf, Greenfield & Sacks, P.C.

(57) ABSTRACT

An integrated circuit includes a photodetection region configured to receive incident photons. The photodetection region is configured to produce a plurality of charge carriers in response to the incident photons. The integrated circuit includes a charge carrier storage region. The integrated circuit also includes a charge carrier segregation structure configured to selectively direct charge carriers of the plurality of charge carriers directly into the at least one charge carrier storage region based upon times at which the charge carriers are produced.

7 Claims, 18 Drawing Sheets

(51) Int. Cl.
  *G01N 21/64* (2006.01)
  *G06T 7/00* (2017.01)
  *H04N 5/374* (2011.01)
(52) U.S. Cl.
  CPC ...... *H04N 5/3745* (2013.01); *G01J 2001/446* (2013.01); *G01J 2001/448* (2013.01); *G01N 21/6428* (2013.01); *G01N 2021/6439* (2013.01); *G06T 7/0012* (2013.01); *G06T 2207/10028* (2013.01); *G06T 2207/10064* (2013.01); *G06T 2207/30204* (2013.01); *H04N 5/374* (2013.01)
(58) Field of Classification Search
  CPC ....... G01N 2021/6439; G01N 21/6458; G01N 21/6408; G06T 7/0012; G06T 2207/10028; G06T 2207/10064; G06T 2207/30204; H04N 5/374; H04N 5/3745
  See application file for complete search history.

(56) References Cited

U.S. PATENT DOCUMENTS

| | | |
|---|---|---|
| 5,355,165 A | 10/1994 | Kosonocky et al. |
| 5,471,515 A | 11/1995 | Fossum et al. |
| 5,674,743 A | 10/1997 | Ulmer |
| 5,822,472 A | 10/1998 | Danielzik et al. |
| 5,912,155 A | 6/1999 | Chatterjee et al. |
| 5,961,924 A | 10/1999 | Reichert et al. |
| 6,137,117 A | 10/2000 | Feldstein et al. |
| 6,198,869 B1 | 3/2001 | Kraus et al. |
| 6,210,896 B1 | 4/2001 | Chan |
| 6,232,103 B1 | 5/2001 | Short |
| 6,255,083 B1 | 7/2001 | Williams |
| 6,261,797 B1 | 7/2001 | Sorge et al. |
| 6,265,193 B1 | 7/2001 | Brandis et al. |
| 6,280,939 B1 | 8/2001 | Allen |
| 6,327,410 B1 | 12/2001 | Walt et al. |
| 6,355,420 B1 | 3/2002 | Chan |
| 6,399,320 B1 | 6/2002 | Markau et al. |
| 6,399,335 B1 | 6/2002 | Kao et al. |
| 6,437,345 B1 | 8/2002 | Bruno-Raimondi et al. |
| 6,445,491 B2 | 9/2002 | Sucha et al. |
| 6,607,883 B1 | 8/2003 | Frey et al. |
| 6,686,582 B1 | 2/2004 | Volcker et al. |
| 6,716,394 B2 | 4/2004 | Jensen et al. |
| 6,787,308 B2 | 9/2004 | Balasubramanian et al. |
| 6,825,921 B1 | 11/2004 | Modlin et al. |
| 6,917,726 B2 | 7/2005 | Levene et al. |
| 6,936,702 B2 | 8/2005 | Williams et al. |
| 6,975,898 B2 | 12/2005 | Seibel |
| 7,033,762 B2 | 4/2006 | Nelson et al. |
| 7,052,847 B2 | 5/2006 | Korlach et al. |
| 7,057,026 B2 | 6/2006 | Barnes et al. |
| 7,153,672 B1 | 12/2006 | Eickbush et al. |
| 7,158,224 B2 | 1/2007 | Montagu |
| 7,170,050 B2 | 1/2007 | Turner et al. |
| 7,175,811 B2 | 2/2007 | Bach et al. |
| 7,179,654 B2 | 2/2007 | Verdonk et al. |
| 7,270,951 B1 | 9/2007 | Stemple et al. |
| 7,345,764 B2 | 3/2008 | Bulovic et al. |
| 7,393,640 B2 | 7/2008 | Kumar et al. |
| 7,405,281 B2 | 7/2008 | Xu et al. |
| 7,426,322 B2 | 9/2008 | Hyde |
| 7,462,452 B2 | 12/2008 | Williams et al. |
| 7,595,883 B1 | 9/2009 | El Gamal et al. |
| 7,630,073 B2 | 12/2009 | Lundquist et al. |
| 7,738,086 B2 | 6/2010 | Shepard et al. |
| 7,745,116 B2 | 6/2010 | Williams |
| 7,820,983 B2 | 10/2010 | Lundquist et al. |
| 7,834,329 B2 | 11/2010 | Lundquist et al. |
| 7,838,847 B2 | 11/2010 | Lundquist et al. |
| 7,871,777 B2 | 1/2011 | Schneider et al. |
| 7,873,085 B2 | 1/2011 | Babushkin et al. |
| 7,875,440 B2 | 1/2011 | Williams et al. |
| 7,968,702 B2 | 6/2011 | Wegener et al. |
| 7,973,146 B2 | 7/2011 | Shen et al. |
| 7,981,604 B2 | 7/2011 | Quake |
| 8,053,742 B2 | 11/2011 | Lundquist et al. |
| 8,058,030 B2 | 11/2011 | Smith et al. |
| 8,133,672 B2 | 3/2012 | Bjornson et al. |
| 8,153,375 B2 | 4/2012 | Travers et al. |
| 8,174,696 B2 | 5/2012 | Ebbesen et al. |
| 8,207,509 B2 | 6/2012 | Lundquist et al. |
| 8,238,993 B2 | 8/2012 | Maynard et al. |
| 8,274,034 B2 | 9/2012 | Vogel et al. |
| 8,274,040 B2 | 9/2012 | Zhong et al. |
| 8,278,728 B2 | 10/2012 | Murshid |
| 8,323,939 B2 | 12/2012 | Hanzel et al. |
| 8,343,746 B2 | 1/2013 | Rank et al. |
| 8,465,699 B2 | 6/2013 | Fehr et al. |
| 8,471,219 B2 | 6/2013 | Lundquist et al. |
| 8,471,230 B2 | 6/2013 | Zhong et al. |
| 8,481,264 B2 | 7/2013 | Bjornson et al. |
| 8,501,406 B1 | 8/2013 | Gray et al. |
| 8,501,922 B2 | 8/2013 | Otto et al. |
| 8,502,169 B2 | 8/2013 | Rigneault et al. |
| 8,580,539 B2 | 11/2013 | Korlach |
| 8,618,507 B1 | 12/2013 | Lundquist et al. |
| 8,865,077 B2 | 10/2014 | Chiou et al. |
| 8,921,086 B2 | 12/2014 | Hanzel et al. |
| 9,029,802 B2 | 5/2015 | Lundquist et al. |
| 9,062,091 B2 | 6/2015 | Bjornson et al. |
| 9,127,259 B2 | 9/2015 | Bjornson et al. |
| 9,157,864 B2 | 10/2015 | Fehr et al. |
| 9,222,123 B2 | 12/2015 | Zhong et al. |
| 9,222,133 B2 | 12/2015 | Lundquist et al. |
| 9,223,084 B2 | 12/2015 | Grot et al. |
| 9,372,308 B1 | 6/2016 | Saxena et al. |
| 9,587,276 B2 | 3/2017 | Lundquist et al. |
| 9,606,058 B2 | 3/2017 | Rothberg et al. |
| 9,606,060 B2 | 3/2017 | Chen et al. |
| 9,658,161 B2 | 5/2017 | Saxena et al. |
| 9,666,748 B2 | 5/2017 | Leobandung |
| 9,696,258 B2 | 7/2017 | Rothberg et al. |
| 9,719,138 B2 | 8/2017 | Zhong et al. |
| 9,759,658 B2 | 9/2017 | Rothberg et al. |
| 9,765,395 B2 | 9/2017 | Goldsmith |
| 9,945,779 B2 | 4/2018 | Rothberg et al. |
| 9,946,017 B2 | 4/2018 | Saxena et al. |
| 10,018,764 B2 | 7/2018 | Grot et al. |
| 10,090,429 B2 | 10/2018 | Leobandung |
| 10,138,515 B2 | 11/2018 | Fehr et al. |
| 10,280,457 B2 | 5/2019 | Zhong et al. |
| 10,310,178 B2 | 6/2019 | Saxena et al. |
| 10,441,174 B2 | 10/2019 | Rothberg et al. |
| 10,487,356 B2 | 11/2019 | Lundquist et al. |
| 10,578,788 B2 | 3/2020 | Grot et al. |
| 10,655,172 B2 | 5/2020 | Rank et al. |
| 10,724,090 B2 | 7/2020 | McCaffrey et al. |
| 10,775,305 B2 | 9/2020 | Rothberg et al. |
| 10,845,308 B2 | 11/2020 | Rothberg et al. |
| 2001/0009269 A1 | 7/2001 | Hayashi |
| 2001/0017727 A1 | 8/2001 | Sucha et al. |
| 2001/0055462 A1 | 12/2001 | Seibel |
| 2002/0031836 A1 | 3/2002 | Feldstein |
| 2002/0182716 A1 | 12/2002 | Weisbuch et al. |
| 2003/0174992 A1 | 9/2003 | Levene et al. |
| 2004/0004194 A1 | 1/2004 | Amblard et al. |
| 2004/0106163 A1 | 6/2004 | Workman et al. |
| 2004/0144927 A1 | 7/2004 | Auner et al. |
| 2004/0169842 A1 | 9/2004 | Dosluoglu et al. |
| 2005/0256650 A1 | 11/2005 | Labarbe et al. |
| 2006/0019265 A1 | 1/2006 | Song et al. |
| 2006/0249657 A1 | 11/2006 | O'Grady |
| 2007/0042500 A1 | 2/2007 | Meyer-Aimes et al. |
| 2007/0250274 A1 | 10/2007 | Volkov et al. |
| 2007/0281288 A1 | 12/2007 | Belkin et al. |
| 2008/0050747 A1 | 2/2008 | Korlach et al. |
| 2008/0097174 A1 | 4/2008 | Maynard et al. |
| 2009/0014658 A1 | 1/2009 | Cottier et al. |
| 2010/0009872 A1 | 1/2010 | Eid et al. |
| 2010/0065726 A1 | 3/2010 | Zhong et al. |
| 2010/0141927 A1 | 6/2010 | Hashimoto et al. |

(56) References Cited

U.S. PATENT DOCUMENTS

| | | |
|---|---|---|
| 2010/0173394 A1 | 7/2010 | Colston et al. |
| 2010/0255487 A1 | 10/2010 | Beechem et al. |
| 2010/0323406 A1 | 12/2010 | Vatta et al. |
| 2011/0136201 A1 | 6/2011 | Mao et al. |
| 2011/0165652 A1 | 7/2011 | Hardin et al. |
| 2011/0236983 A1 | 9/2011 | Beechem et al. |
| 2011/0298079 A1 | 12/2011 | Kawahito |
| 2012/0021525 A1 | 1/2012 | Fehr et al. |
| 2012/0094332 A1 | 4/2012 | Lee et al. |
| 2012/0224053 A1 | 9/2012 | Vykoukal et al. |
| 2012/0322692 A1 | 12/2012 | Pham et al. |
| 2013/0005047 A1 | 1/2013 | Mayer et al. |
| 2013/0023039 A1 | 1/2013 | Zaccarin et al. |
| 2013/0071849 A1 | 3/2013 | Kong et al. |
| 2013/0072768 A1 | 3/2013 | Crane et al. |
| 2013/0090537 A1 | 4/2013 | Schemmann et al. |
| 2013/0116153 A1 | 5/2013 | Bowen et al. |
| 2013/0149734 A1 | 6/2013 | Ammar et al. |
| 2013/0183676 A1 | 7/2013 | Chen et al. |
| 2013/0217007 A1 | 8/2013 | Kamtekar et al. |
| 2013/0270610 A1 | 10/2013 | Suess et al. |
| 2014/0217264 A1 | 8/2014 | Shepard et al. |
| 2014/0231879 A1* | 8/2014 | Meynants ......... H01L 27/14887 257/230 |
| 2015/0014126 A1 | 1/2015 | Snow |
| 2015/0042954 A1 | 2/2015 | Hunter et al. |
| 2015/0141267 A1 | 5/2015 | Rothberg et al. |
| 2015/0141268 A1 | 5/2015 | Rothberg et al. |
| 2015/0172526 A1 | 6/2015 | Swihart et al. |
| 2015/0173621 A1 | 6/2015 | Guo et al. |
| 2015/0293021 A1 | 10/2015 | Finkelstein et al. |
| 2016/0041095 A1 | 2/2016 | Rothberg et al. |
| 2016/0084761 A1 | 3/2016 | Rothberg et al. |
| 2016/0133668 A1 | 5/2016 | Rothberg et al. |
| 2016/0181298 A1 | 6/2016 | Wan et al. |
| 2016/0338631 A1 | 11/2016 | Li et al. |
| 2016/0356718 A1 | 12/2016 | Yoon et al. |
| 2016/0377543 A1 | 12/2016 | Rothberg et al. |
| 2016/0380025 A1 | 12/2016 | Rothberg et al. |
| 2017/0107562 A1 | 4/2017 | Rothberg et al. |
| 2017/0146479 A1 | 5/2017 | Levine et al. |
| 2017/0231500 A1 | 8/2017 | Rothberg et al. |
| 2017/0322153 A1 | 11/2017 | Rothberg et al. |
| 2018/0180546 A1 | 6/2018 | Rothberg et al. |
| 2018/0259456 A1 | 9/2018 | Rothberg et al. |
| 2019/0292590 A1 | 9/2019 | Zhong et al. |
| 2019/0374107 A1 | 12/2019 | Rothberg et al. |
| 2020/0072752 A1 | 3/2020 | Cipriany |
| 2021/0025823 A1 | 1/2021 | Rothberg et al. |
| 2021/0025824 A1 | 1/2021 | Rothberg et al. |

FOREIGN PATENT DOCUMENTS

| | | |
|---|---|---|
| CN | 1138862 C | 2/2004 |
| CN | 1867822 A | 11/2006 |
| CN | 102348406 A | 2/2012 |
| CN | 102388321 A | 3/2012 |
| CN | 102395874 A | 3/2012 |
| CN | 102713569 A | 10/2012 |
| CN | 102914525 A | 2/2013 |
| CN | 102933144 A | 2/2013 |
| CN | 103728446 A | 4/2014 |
| CN | 105300949 A | 2/2016 |
| EP | 1681356 A1 | 7/2006 |
| EP | 2182523 A1 | 5/2010 |
| EP | 2339632 A1 | 6/2011 |
| EP | 2391639 | 12/2011 |
| EP | 2134871 B1 | 3/2012 |
| EP | 2487897 A1 | 8/2012 |
| EP | 3194935 A2 | 7/2017 |
| JP | 2000-165750 A | 6/2000 |
| JP | 2010-233843 A | 10/2010 |
| JP | 2012-132741 A | 7/2012 |
| WO | WO 91/06678 A1 | 5/1991 |
| WO | WO 2004/047353 A2 | 6/2004 |
| WO | WO 2005/073407 A1 | 8/2005 |
| WO | WO 2007/015168 A2 | 2/2007 |
| WO | WO 2010/025331 A1 | 3/2010 |
| WO | WO 2011/103497 A1 | 8/2011 |
| WO | WO 2011/103507 A1 | 8/2011 |
| WO | WO 2011/153962 A1 | 12/2011 |
| WO | WO 2013/171197 A1 | 11/2013 |
| WO | WO 2016/022998 A2 | 2/2016 |
| WO | WO 2016/022998 A3 | 2/2016 |
| WO | WO 2016/128198 A1 | 8/2016 |
| WO | WO 2016/187580 A1 | 11/2016 |
| WO | WO 2017/210413 A1 | 12/2017 |

OTHER PUBLICATIONS

Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.
PCT/US2019/038105, Nov. 26, 2019, International Search Report and Written Opinion.
PCT/US2019/048824, Dec. 9, 2019, Invitation to Pay Additional Fees.
PCT/US2019/048824, Jan. 31, 2020, International Search Report and Written Opinion.
International Preliminary Report on Patentability for International Application No. PCT/US2019/038105 dated Dec. 30, 2020.
International Preliminary Report on Patentability for International Application No. PCT/US2019/048824 dated Mar. 11, 2021.
U.S. Appl. No. 16/984,537, filed Aug. 4, 2020, Rothberg et al.
U.S. Appl. No. 17/071,833, filed Oct. 15, 2020, Rothberg et al.
PCT/US2019/038105, Dec. 30, 2020, International Preliminary Report on Patentability.
PCT/US2019/048824, Mar. 11, 2021, International Preliminary Report on Patentability.
International Search Report and Written Opinion for International Application No. PCT/US2019/038105 dated Nov. 26, 2019.
Invitation to Pay Additional Fees for International Application No. PCT/US2019/048824 dated Dec. 9, 2019.
International Search Report and Written Opinion for International Application No. PCT/US2019/048824 dated Jan. 31, 2020.
Li et al., Time-Domain Fluorescence Lifetime Imaging Techniques Suitable for Solid-State Imaging Sensor Arrays. Sensors. 2012;12(12):5651-5653. DOI: 10.3390/s120505650.
U.S. Appl. No. 15/852,571, filed Dec. 22, 2017, Rothberg et al.
U.S. Appl. No. 15/914,019, filed Mar. 7, 2018, Rothberg et al.
U.S. Appl. No. 16/550,841, filed Aug. 26, 2019, Rothberg et al.
U.S. Appl. No. 16/554,751, filed Aug. 29, 2019, Cipriany.
EP 15759983.8, Aug. 1, 2018, Third Party Observations.
EP 18202357.2, Mar. 15, 2019, Extended European Search Report.
EP 17753881.6, Sep. 19, 2019, Extended European Search Report.
PCT/US2014/066010, Jan. 28, 2015, Invitation to Pay Additional Fees.
PCT/US2014/066010, Apr. 7, 2015, International Search Report and Written Opinion.
PCT/US2014/066010, May 26, 2016, International Preliminary Report on Patentability.
PCT/US2014/066013, Jan. 28, 2015, Invitation to Pay Additional Fees.
PCT/US2014/066013, Apr. 7, 2015, International Search Report and Written Opinion.
PCT/US2014/066013, May 26, 2016, International Preliminary Report on Patentability.
PCT/US2014/066014, Jan. 28, 2015, Invitation to Pay Additional Fees.
PCT/US2014/066014, Apr. 7, 2015, International Search Report and Written Opinion.
PCT/US2014/066014, May 26, 2016, International Preliminary Report on Patentability.
PCT/US2015/044360, Nov. 20, 2015, Invitation to Pay Additional Fees.

(56) References Cited

OTHER PUBLICATIONS

PCT/US2015/044360, Feb. 3, 2016, International Search Report and Written Opinion.
PCT/US2015/044378, Oct. 30, 2015, Invitation to Pay Additional Fees.
PCT/US2015/044378, Jan. 15, 2016, International Search Report and Written Opinion.
PCT/US2015/044379, Nov. 2, 2015, Invitation to Pay Additional Fees.
PCT/US2015/044379, Jan. 15, 2016, International Search Report and Written Opinion.
PCT/US17/18278, Apr. 25, 2017, International Search Report and Written Opinion.
PCT/US2017/018278, Aug. 30, 2018, International Preliminary Report on Patentability.
PCT/US2017/068089, Mar. 27, 2018, International Search Report and Written Opinion.
PCT/US2019/038105, Sep. 16, 2019, Invitation to Pay Additional Fees.
Third Party Observations for European Application No. 15759983.8 dated Aug. 1, 2018.
Extended European Search Report for European Application No. 18202357.2 dated Mar. 15, 2019.
Extended European Search Report for European Application No. 17753881.6 dated Sep. 19, 2019.
International Search Report and Written Opinion for International Application No. PCT/US17/18278 dated Apr. 25, 2017.
International Preliminary Report on Patentability for International Application No. PCT/US2017/018278 dated Aug. 30, 2018.
Invitation to Pay Additional Fees for International Application No. PCT/US2014/066014 dated Jan. 28, 2015.
International Search Report and Written Opinion for International Application No. PCT/US2014/066014 dated Apr. 7, 2015.
International Preliminary Report on Patentability for International Application No. PCT/US2014/066014 dated May 26, 2016.
Invitation to Pay Additional Fees for International Application No. PCT/US2015/044360 dated Nov. 20, 2015.
International Search Report and Written Opinion for International Application No. PCT/US2015/044360 dated Feb. 3, 2016.
Invitation to Pay Additional Fees for International Application No. PCT/US2015/044378 dated Oct. 30, 2015.
International Search Report and Written Opinion for International Application No. PCT/US2015/044378 dated Jan. 15, 2016.
Invitation to Pay Additional Fees for International Application No. PCT/US2015/044379 dated Nov. 2, 2015.
International Search Report and Written Opinion for International Application No. PCT/US2015/044379 dated Jan. 15, 2016.
Invitation to Pay Additional Fees for International Application No. PCT/US2014/066013 dated Jan. 28, 2015.
International Search Report and Written Opinion for International Application No. PCT/US2014/066013 dated Apr. 7, 2015.
International Preliminary Report on Patentability for International Application No. PCT/US2014/066013 dated May 26, 2016.
Invitation to Pay Additional Fees for International Application No. PCT/US2014/066010 dated Jan. 28, 2015.
International Search Report and Written Opinion for International Application No. PCT/US2014/066010 dated Apr. 7, 2015.
International Preliminary Report on Patentability for International Application No. PCT/US2014/066010 dated May 26, 2016.
International Search Report and Written Opinion for International Application No. PCT/US2017/068089 dated Mar. 27, 2018.
Invitation to Pay Additional Fees for International Application No. PCT/US2019/038105 dated Sep. 16, 2019.
[No Author Listed] 5.2 Megapixels, 1-inch, 250fps, global-shutter CMOS image sensor, Anafocus, Oct. 2012, 4 pages, Sevilla, Spain.
[No Author Listed] Description of our technology, CrackerBio, 4 pages, Taiwan.
[No Author Listed] Detect Cancer with our 4 Picos ICCD camera, Stanford Computer Optics, 2013, 2 pages, http://www.stanfordcomputeroptics.com/applications/life-science/time-resolved-flim.html [last accessed May 9, 2014].
[No Author Listed] ICCD camera applications in the field of Life Science, Stanford Computer Optics, 2013, 2 pages, http://www.stanfordcomputeroptics.com/applications/life-science.html [last accessed May 9, 2014].
[No Author Listed] OLED-on-CMOS for Sensors and Microdisplays, IPMS Fraunhofer Institut Photonische Mikrosysteme, 2 pages, Dresden, Germany.
Achermann, Exciton—Plasmon Interactions in Metal—Semiconductor Nanostructures, The Journal Physical Chemistry Letters, Sep. 13, 2010, 1(19):2837-43.
Akselrod et al., Twenty-fold enhancement of molecular fluorescence by coupling to a J-aggregate critically coupled resonator. ACS Nano. Jan. 24, 2012;6(1):467-71. doi: 10.1021/nn203789t. Epub Dec. 1, 2011.
Algar et al., Interfacial Chemistry and the Design of Solid-Phase Nucleic Acid Hybridization Assays Using Immobilized Quantum Dots as Donors in Fluorescence Resonance Energy Transfer, Sensors, Jun. 2011, 11(6):6214-36.
Aouani et al., Bright unidirectional fluorescence emission of molecules in a nanoaperture with plasmonic corrugations. Nano Lett. Feb. 9, 2011;11(2):637-44. doi: 10.1021/n1103738d. Epub Jan. 19, 2011.
Aouani et al., Plasmonic Antennas for Directional Sorting of Fluorescence Emission, Nano Letters, May 18, 2011, 11(6):2400-6.
Aouani et al., Saturated excitation of fluorescence to quantify excitation enhancement in aperture antennas, Optics Express, Jul. 30, 2012, 20(16):18085-90.
Aouani et al., Supporting Information for Bright unidirectional fluorescence emission of molecules in a nanoaperture with plasmonic corrugations. Nano Lett. Feb. 9, 2011;11(2):19 pages.
Aouani et al., Supporting Information for Plasmonic Antennas for Directional Sorting of Fluorescence Emission, Nano Letters, May 18, 2011, 11(6):9 pages.
Bergman et al., Surface Plasmon Amplification by Stimulated Emission of Radiation: Quantum Generation of Coherent Surface Plasmons in Nanosystems, Physical Review Letters, Jan. 17, 2013, 90(2):027402-1-4.
Bogaerts et al., High speed 36 Gbps 12Mpixel global pipelined shutter CMOS image sensor with CDS, 2011 International Image Sensor Workshop, Jun. 8-11, 2011, 4 pages, Hokkaido, Japan.
Carretero-Palacious et al., Mechanisms for extraordinary optical transmission through bull's eye structures, Optics Express, May 23, 2011, 19(11):10429-42.
Chanyawadee et al., Nonradiative exciton energy transfer in hybrid organic-inorganic heterostructures, Phys. Rev. B., May 14, 2008, 77(19): 193402-1-4.
Daldosso et al., Fabrication and optical characterization of thin two-dimensional Si3N4 waveguides, Materials Science in Semiconductor Processing, Oct. 18, 2004, 7(4-6): 453-8.
Davies et al., Plasmonic Nanogap Tilings: Light-Concentrating Surfaces for Low-Loss Photonic Integration, ACS Nano, Jul. 4, 2013, 7(8):7093-100, arXiv:1305.2839v2, http://arxiv.org/abs/1305.2839v2.
Deshpande et al., Electrically driven polarized single-photon emission from an InGaN quantum dot in a GaN nanowire, Nature Communications, Apr. 9, 2013, 8 pages.
Deutsch et al., Luminescence upconversion in colloidal double quantum dots, Nature Nanotechnology Letter, Sep. 2013, 8(9):649-53.
Edel et al., Accurate Single Molecule FRET Efficiency Determination for Surface Immobilized DNA Using Maximum Likelihood Calculated Lifetimes, J. Phys. Chem, Mar. 22, 2007, 111(11):2986-90.
Eggeling et al., Monitoring conformational dynamics of a single molecule by selective fluorescence spectroscopy. Proc. Natl. Acad. Sci. 1998;95:1556-61.
Eid et al., Real-time DNA sequencing from single polymerase molecules. Science. Jan. 2, 2009;323(5910):133-8. doi:10.1126/science.1162986. Epub Nov. 20, 2008.

(56) References Cited

OTHER PUBLICATIONS

Eid et al., Supporting Online Material for Real-time DNA sequencing from single polymerase molecules. Science. Jan. 2, 2009;323(5910):21 pages.
Feldman et al., Wafer-Level Camera Technologies Shrink Camera Phone Handsets, Photonics.com, Aug. 1, 2007, 3 pages, http://www.photonics.com/Article.aspx?AID=30459 . [last accessed Dec. 17, 2013].
Fu et al., A microfabricated fluorescence-activated cell sorter. Nature Biotechnology. Nov. 1999; 17(11): 1109-1111.
Gorin et al., Fabrication of silicon nitride waveguides for visible-light using PECVD: a study of the effect of plasma frequency on optical properties, Optics Express, Sep. 1, 2008, 16(18):13509-16.
Gryczynski et al., Two-photon excitation by the evanescent wave from total internal reflection. Anal Biochem., Apr. 5, 1997;247(1):69-76.
Haase et al., Upconverting Nanoparticles, Angewandte Chemie International Edition, Jun. 20, 2011, 50(26):5808-29.
Hallman et al., 3 nJ, 100 ps laser pulses generated with an asymmetric waveguide laser diode for a single-photon avalanche diode time-of-flight (SPAD TOF) rangefinder application, Measurement Science and Technology, Jan. 5, 2012, 23(2): 8 pages.
Hansard et al., Time-of-Flight Cameras: Principles, Methods and Applications, Nov. 2012, 102 pages, Springer-Verlag, London, UK.
He et al., DNA Sequencing by Capillary Electrophoresis with Four-Decay Fluorescence Detection, Anal. Chem., Dec. 15, 2000, 72(24):5865-73.
Herold et al., OLED-on-CMOS Integration for Augmented-Reality Systems, IEEE 2008 International Students and Young Scientists Workshop Photonics and Microsystems, Jun. 20-22, 2008, 19-22, Wroclaw—Szlarska Poreba, Poland.
Heucke et al., Placing Individual Molecules in the Center of Nanoapertures, Nano Letters, Feb. 12, 2014, 14(2):391-5.
Inoue et al., CMOS active pixel image sensor with in-pixel CDS for high-speed cameras, Proc. SPIE, Sensors and Camera Systems for Scientific, Industrial, and Digital Photography Applications V, 250, Jun. 7, 2004, 5301(4):8 pages.
Ishii et al., Self-matched high-voltage rectangular wave pulse generator, Rev. Sci. Instrum, Nov. 1985, 56(11):2116-8.
Jun et al., Plasmonic beaming and active control over fluorescent emission, Nature Communications, Apr. 19, 2011, 6 pages.
Juodawlkis et al., High-Power, Low-Noise Slab-Coupled Optical Waveguide (SCOW) Amplifiers and Lasers, IEEE Optical Society of America Optical Fiber Communication Conference and Exposition and the National FiberOptic Engineers Conference, Mar. 6-10, 2011, 3 pages, Los Angeles, CA.
Juodawlkis et al., High-Power, Ultralow-Noise Semiconductor External Cavity Lasers Based on Low-Confinement Optical Waveguide Gain Media, Proc. of SPIE Novel In-Plane Semiconductor Lasers IX, Feb. 12, 2010, vol. 7616:76160X-1-9.
Kano et al., Two-photon-excited fluorescence enhanced by a surface plasmon. Opt Lett. Nov. 15, 1996;21(22):1848-50.
Karow, PacBio Aims to Boost Throughput of SMRT Technology with Microchip Codevelopment Deal, In Sequence and Clinical Sequencing News, Jul. 24, 2012, 3 pages, GenomeWeb.
Klein et al., Controlling plasmonic hot spots by interfering Airy beams, Optics Letters, Aug. 15, 2012, 37(16): 3402-4.
Korlach et al., Real-time DNA sequencing from single polymerase molecules. Methods Enzymol. May 2010;472:431-55. doi:10.1016/S0076-6879(10)72001-2.
Kreye et al., P-200: Evaluation of different OLED-Stacks for Active-Matrix OLED Microdisplays on CMOS-Substrates, SID 06 Digest, Jun. 2006, 37(1); 979-81.
Kumar et al., Terminal phosphate labeled nucleotides: synthesis, applications, and linker effect on incorporation by DNA polymerases. Nucleosides Nucleotides Nucleic Acids. Nov. 2005;24(5-7):401-8.
Lenne et al., Fluorescence fluctuations analysis in nanoapertures: physical concepts and biological applications, Histochem Cell Biol, Sep. 2008, 130:795-805.
Leslie et al., Convex Lens-Induced Confinement for Imaging Single Molecules, Anal. Chem., Jul. 15, 2010, 82(14):6224-9.
Levy et al., An 852x600 Pixel OLED-on-Silicon Color Microdisplay Using CMOS Subthreshold-Voltage-Scaling Current Drivers, IEEE Journal of Solid-State Circuits, Dec. 2002, 37(12):1879-89.
Lezec et al., Beaming Light from a Subwavelength Aperture, Science, Aug. 2, 2002, 297(5582):820-2.
Li et al., Employing ~100% Excitons in OLEDs by Utilizing a Fluorescent Molecule with Hybridized Local and Charge-Transfer Excited State, Advanced Functional Materials, Mar. 19, 2014, 24(11):1609-14.
Lin et al., Cosine-Gauss Plasmon Beam: A Localized Long-Range Nondiffracting Surface Wave, Physical Review Letters, Aug. 31, 2012, 109(9):093904-1-5.
McGinty et al., Wide-field fluorescence lifetime imaging of cancer, Biomedical Optics Express, Sep. 1, 2010, 1(2): 627-40.
Misra et al., White organic LEDs and their recent advancements, Semiconductor Science and Technology, Apr. 25, 2006, 21(7):R35-47.
Mitchell et al., Nanosecond Fluorescence Lifetime Imaging with gated CCD detection and pulsed laser excitation, Photonic Research Systems Ltd., May 1, 2013, 13 pages, Newhaven East Sussex UK.
Murshid et al., Array of concentric CMOS photodiodes for detection and de-multiplexing of spatially modulated optical channels, Optics & Laser Technology, Sep. 2009, 41(6):764-9.
Murshid et al., CMOS Detectors: Concentric photodiode array enables spatial-domain multiplexing, Laser Focus World, Apr. 1, 2009, 10 pages, http://www.laserfocusworld.com/articles/print/volume-45/issue-4/features/cmos-detectors-concentric-photodiode-array-enables-spatial-domain-multiplexing.html, [last accessed Dec. 12, 2013].
Murshid et al., Concentric octagonal CMOS photodiodes for direct detection of spatially multiplexed optical fiber channels, Optical Society of America, Oct. 2008, 1 page.
Nozik, Multiple exciton generation in semiconductor quantum dots, Chemical Physics Letters, May 20, 2008, 457(1-3):3-11.
Park et al., A dual-modality optical coherence tomography and fluorescence lifetime imaging microscopy system for simultaneous morphological and biochemical tissue characterization. Department of Biomedical Engineering. Texas A&M University. 2010;1(1):186-200.
Pfeifer et al., Improved optical outcoupling of OLED microdisplays by nanostructured substrates, IEEE Semiconductor Conference Dresden, Sep. 27-18, 2011, 4 pages, Dresden, Germany.
Poddubny et al., Photonic quasicrystalline and aperiodic structures, Physica E: Low-dimensional Systems and Nanostructures, May 2010, 42(7): 1871-95.
Pons et al., Solution-phase single quantum dot fluorescence resonance energy transfer. J Am Chem Soc., Nov. 29, 2006; 128(47):15324-31.
Pudavar, Fluorescence Lifetime Imaging (FILM), Leica Microsystems Inc., Oct. 25, 2009, 60 pages, Exton, PA.
Punj et al., Plasmonic antennas and zero-mode waveguides to enhance single molecule fluorescence detection and fluorescence correlation spectroscopy toward physiological concentrations. Wiley Interdiscip Rev Nanomed Nanobiotechnol. May-Jun. 2014;6(3):268-82. doi: 10.1002/wnan.1261. Epub Feb. 24, 2014.
Ramuz et al., Coupling light from an organic light emitting diode (OLED) into a single-mode waveguide: Toward monolithically integrated optical sensors, Journal of Applied Physics, Apr. 2009, 105(8):084508-1-7.
Ran et al., Design of a 16 gray scales 320 × 240 pixels OLED-on-silicon driving circuit, Journal of Semiconductors, Jan. 2009, 30(1):015010-1-4.
Reckziegel et al., Optical sensors based on monlithic integrated organic light-emitting diodes (OLEDs), Proceedings of SPIE Optical Sensors, Apr. 28, 2008, vol. 7003: 8 pages.
Richter et al., Bidirectional OLED microdisplay: Combining display and image sensor functionality into a monolithic CMOS chip, 2011 IEEE International Solid-State Circuits Conference Digest of Technical Papers (ISSCC), Feb. 20-24, 2011, 3 pages, San Francisco, CA.

(56) References Cited

OTHER PUBLICATIONS

Richter et al., OLED-on-CMOS based bidirectional microdisplay for near-to-eye and sensor applications, IEEE Semiconductor Conference Dresden, Sep. 27-28, 2011, 3 pages, Dresden, Germany.
Rigneault et al., Enhancement of Single-Molecule Fluorescence Detection in Subwavelength Apertures, Physical Review Letters, Sep. 9, 2005, 95(11): 117401-1-4.
Romero-Garcia et al., Silicon nitride back-end optics for biosensor applications, Proc. of SPIE Integrated Optics: Physics and Simulations, May 7, 2013, vol. 8781: 87810W-1-11.
Romero-Garcia et al., Visible wavelength silicon nitride focusing grating coupler with AlCu/TiN reflector. Optics Letters. Jul. 15, 2013, 38(14):2521-3.
Rui et al., Demonstration of beam steering via dipole-coupled plasmonic spiral antenna, Scientific Reports, Jul. 19, 2013, 7 pages.
Sakadzic et al., Multi-photon microscopy with a low-cost and highly efficient Cr:LiCAF laser, Optics Express, Dec. 8, 2008, 16(25):20848-63.
Salthouse et al., Development of a Time Domain Fluorimeter for Fluorescent Lifetime Multiplexing Analysis, IEEE Biomed Circuits Syst., Sep. 1, 2008, 2(3): 204-11.
Schalberger et al., 60.4: Distinguished Paper: A Fully Integrated 1" AMOLED Display Using Current Feedback Based on a Five Mask LTPS CMOS Process, SID 10 Digest, May 2010, 41(1):905-8.
Schmidt, Direct Encapsulation of OLED on CMOS, Bio and Nano Packaging Techniques for Electron Devices, Jul. 17, 2012, Chapter 29, 581-99, Springer-Verlag Berling Heidelberg.
Siegfried et al., Gap Plasmons and Near-Field Enhancement in Closely Packed Sub-10 nm Gap Resonators, Nano Lett., Oct. 10, 2013, 13(11):5449-53.
Sorokina et al., Fluorescent Lifetime Trajectories of a Single Fluorophore Reveal Reaction Intermediates During Transcription Initiation, J. Am. Chem. Soc., Jul. 22, 2009, 131(28):9630-31.
Sorokina et al., Supporting Information for Fluorescent Lifetime Trajectories of a Single Fluorophore Reveal Reaction Intermediates During Transcription Initiation, J. Am. Chem. Soc., Jul. 22, 2009, 131(28):4 pages.
Sun et al., Fluorescence lifetime imaging microscopy (FLIM) for image guided surgery, Stanford Computer Optics, 2013, 2 pages, http://www.stanfordcomputeroptics.com/applications/life-science/flim-guided-surgery.html, [last accessed May 9, 2014].
Sun et al., Fluorescence lifetime imaging microscopy for brain tumor image-guided surgery. Journal of Biomedical Optics. 2010;15(5):1-5.
Sun et al., Needle-compatible single fiber bundle image guide reflectance endoscope. JBO Letters. 2010;15(4):1-3.
Taitt et al., Evanescent wave fluorescence biosensors. Biosens Bioelectron. Jun. 2005;20(12):2470-87. Epub Dec. 8, 2004.
Takkellapati et al., Synthesis of aminomethyl- and bis-aminomethyl-fluorescein energy transfer terminators. Nucleosides Nucleotides Nucleic Acids. Dec. 2007;26(10-12):1467-70.
Toerker et al., Integration of Top-Emitting Organic Light Emitting Diodes on CMOS Substrates, Proc. of SPIE Organic Optoelectronics and Photonics III, Apr. 16, 2008, vol. 6999, 4 pages.
Toma et al., Compact surface plasmon-enhanced fluorescence biochip, Opt. Express Apr. 22, 2013, 21(8): 10121-10132.
Toma et al., Surface plasmon-coupled emission on plasmonic Bragg gratings, Optics Express, Jun. 18, 2012, 20(13):14042-53.
Uhring et al., 200 ps FWHM and 100 MHz Repetition Rate Ultrafast Gated Camera for Optical Medical Functional Imaging, Proc. of SPIE Optical Sensing and Detection II, May 9, 2012, vol. 8439, 10 pages.
Unfricht et al., Grating-coupled surface plasmon resonance: a cell and protein microarray platform. Proteomics. Nov. 2005;5(17):4432-42.
Vogel et al., OLED-on-CMOS Integration for Optoelectronic Sensor Applications, Proc. of SPIE Silicon Photonics II, Mar. 1, 2007, vol. 6477:8 pages.
Vogel et al., Optoelectronic Sensors based on OLED-on-CMOS, 2008 2nd European Conference & Exhibition on Integration Issues of Minaturized Systems—MOMS, MOEMS, ICS, and Electronic Components (SSI), Apr. 9-10, 2008, 3 pages, Barcelona, Spain.
Von Ketteler et al., Fluorescence Lifetime-Based Glucose Sensing using NADH, Proc. of SPIE Optical Diagnostics and Sensing XII: Toward Point-of-Care Diagnostics; and Design and Performance Validation of Phantoms Used in Conjunction with Optical Measurement of Tissue IV, Feb. 1, 2012, vol. 8229, 8 pages.
Walpole, Slab-coupled optical waveguide lasers: a review, Proc. SPIE Novel In-Plane Semiconductor Lasers III, May 11, 2004, vol. 5365, 124-32.
Wenger et al., Emission and excitation contributions to enhanced single molecule fluorescence by gold nanometric apertures, Optics Express, Mar. 3, 2008, 16(5):3008-20.
Wenger et al., Enhanced fluorescence from metal nanoapertures: physical characterizations and biophotonic applications, Proc. SPIE Plasmonics in Biology and Medicine VII, Feb. 16, 2010, 8 pages.
Wenger, Aperture optical antennas, Optical Antennas, Feb. 2013, 25pages, Cambridge University Press, Cambridge, UK.
Willoughby, Elastically Averaged Precision Alignment, Massachusetts Institute of Technology, Jun. 2005, 158 pages, Cambridge, MA.
Xiong et al., Aluminum nitrade as a new material for chip-scale optomechanics and nonlinear optics, New Journal of Physics, Sep. 17, 2012, 14: 21 pages.
Yan-Yan et al., OLED-on-silicon chip with new pixel circuit, J. Cent. South Univ., May 2012 19(5):1276-82.
Yu et al., Light Propagation with Phase Discontinuities: Generalized Laws of Reflection and Refraction, Science, Oct. 21, 2011, 334 (6054):333-7.
Yuk et al. Analysis of immunoarrays using a gold grating-based dual mode surface plasmon-coupled emission (SPCE) sensor chip. Analyst. Jun. 7, 2012; 137(11):2574-81. doi: 10.1039/c2an35143a. Epub Apr. 13, 2012.
Zhang et al., Continuous metal plasmonic frequency selective surfaces, Optics Express, Nov. 7, 2011, 19(23):23279-85.
Zhao et al., Plasmonic demultiplexer and guiding. ACS Nano. Nov. 23, 2010;4(11):6433-8. doi: 10.1021/nnl01334a. Epub Oct. 6, 2010.
Zhu et al., Zero-Mode Waveguides for Single-Molecule Analysis, Annu. Rev. Biophys., Jun. 2012, 41:269-93.
Zong et al., Equivalent Circuit Model of Top-emitting OLED for the Designing of OLED-on-Silicon Microdisplay, Advanced Materials Research, Nov. 2011, 383-90:7037-42.

* cited by examiner

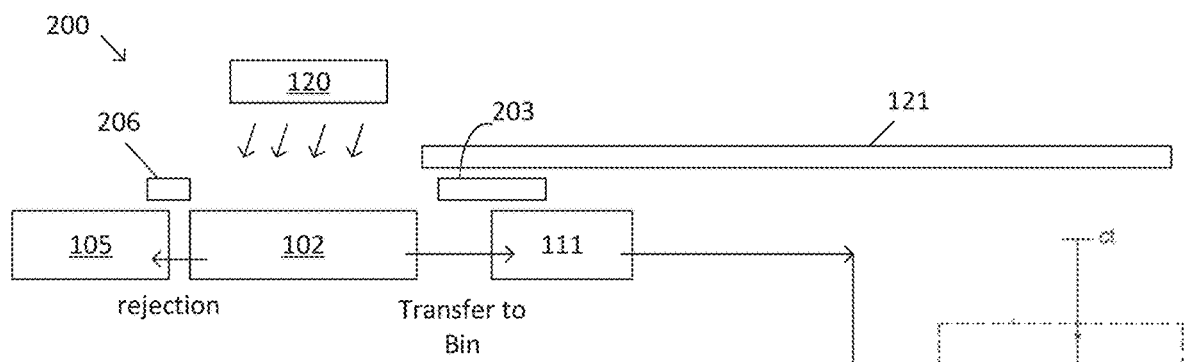
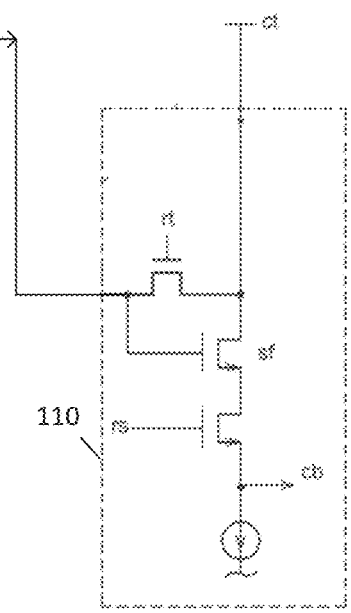
FIG. 8A
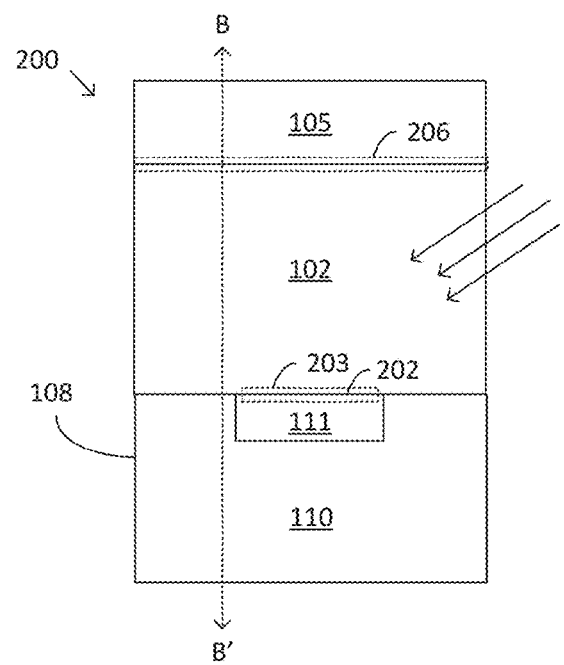
FIG. 8B

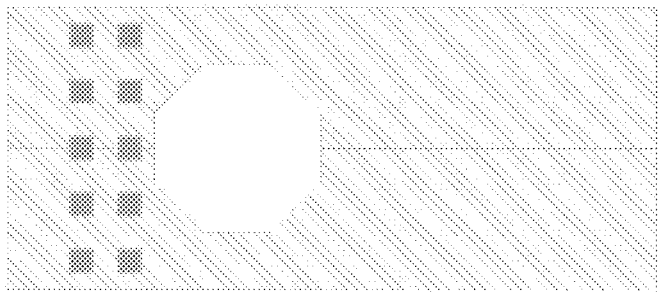
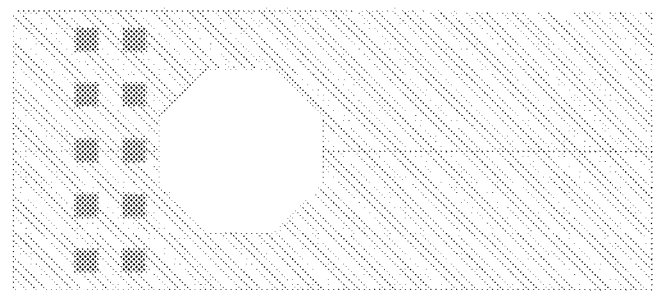
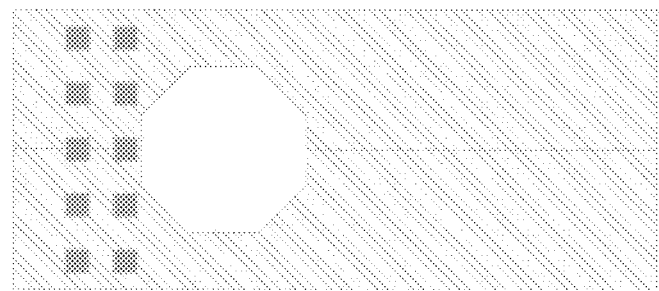
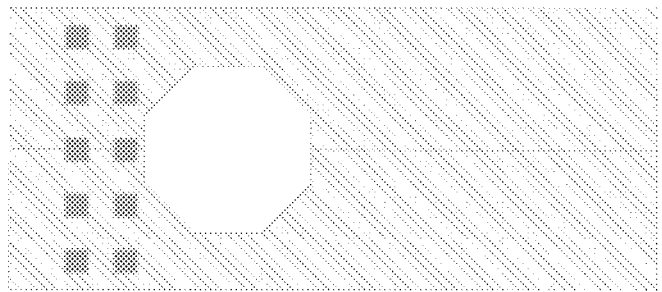
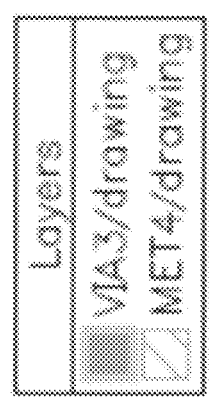
FIG. 14

INTEGRATED PHOTODETECTOR WITH CHARGE STORAGE BIN OF VARIED DETECTION TIME

CROSS-REFERENCE TO RELATED APPLICATIONS

This application claims priority under 35 U.S.C. § 119(e) to U.S. Provisional Application Ser. No. 62/688,669, titled "INTEGRATED PHOTODETECTOR WITH CHARGE STORAGE BIN OF VARIED DETECTION TIME" filed Jun. 22, 2018, which is herein incorporated by reference in its entirety.

This application is related to U.S. non-provisional application Ser. No. 15/852,571, titled "INTEGRATED PHOTODETECTOR WITH DIRECT BINNING PIXEL," filed Dec. 22, 2017, which is hereby incorporated by reference in its entirety.

BACKGROUND

Photodetectors are used to detect light in a variety of applications. Integrated photodetectors have been developed that produce an electrical signal indicative of the intensity of incident light. Integrated photodetectors for imaging applications include an array of pixels to detect the intensity of light received from across a scene. Examples of integrated photodetectors include charge coupled devices (CCDs) and Complementary Metal Oxide Semiconductor (CMOS) image sensors.

SUMMARY

An integrated circuit may comprise: a photodetection region configured to receive incident photons, the photodetection region being configured to produce a plurality of charge carriers in response to the incident photons; a charge carrier storage region; and a charge carrier segregation structure configured to: direct one or more first charge carriers of the plurality of charge carriers into a charge carrier rejection region during a rejection period; and direct one or more second charge carriers of the plurality of charge carriers directly from the photodetection region into the charge carrier storage region during a detection period.

The integrated circuit may be configured to vary a timing of the rejection period, the detection period, or both the rejection period and the detection period.

The integrated circuit may be configured to vary a timing of the rejection period, the detection period, or both the rejection period and the detection period in different frames.

Each frame may comprise a plurality of repetitions of: a rejection period; and a detection period, and each frame may further comprise readout of the charge carrier storage region.

The integrated circuit may be configured to aggregate charge carriers in the charge carrier storage region over a frame and to read out a signal indicative of a quantity of the aggregated charge carriers.

The integrated circuit may be configured to switch between at least: a first frame with a first timing of the rejection period, the detection period, or both the rejection period and the detection period; and a second frame with a second timing of the rejection period, the detection period, or both the rejection period and the detection period.

The first frame may have a first detection period and the second frame may have a second detection period different from the first detection period.

The integrated circuit may be further configured to switch between the first and second frames and a third frame with a third timing of the rejection period, the detection period, or both the rejection period and the detection period.

The first frame may include a first readout of the charge carrier storage region and the second frame includes a second readout of the charge carrier storage region.

The charge carrier segregation structure may comprise at least one electrode at a boundary between the photodetection region and the charge carrier storage region.

The charge carrier segregation structure may comprise a single electrode at the boundary between the photodetection region and the first charge carrier storage region.

The charge carrier rejection region may be adjacent to the photodetection region.

The integrated circuit may have no charge carrier capture region is present between the photodetection region and the charge carrier storage region.

Charge carriers may be transferred to the charge carrier storage region without capturing the carriers between the photodetection region and charge carrier storage region.

Discarded charge carriers may be removed from the photodetection region in a different direction from a direction in which carriers are directed from the photodetection region toward the charge carrier storage region.

The charge carrier rejection region may discard charge carriers produced in the photodetection region during a rejection period by changing a voltage of an electrode at a boundary between the photodetection region and the charge carrier rejection region.

Single electrons may be transferred to the charge carrier storage region and aggregated in the charge carrier storage region.

The charge carrier storage region may be a single charge carrier storage region.

The integrated circuit may have no other charge carrier storage regions configured to receive photogenerated charge carriers directly from the photodetection region.

The charge carrier storage region may be a first charge carrier storage region, and the integrated circuit may further comprise a second charge carrier storage region configured to receive charge carriers from the first charge carrier storage region.

The second charge carrier storage region may be a readout node for a pixel.

A photodetection method may include directing one or more first charge carriers of a plurality of charge carriers produced by a photodetection region into a charge carrier rejection region during a rejection period; and directing one or more second charge carriers of the plurality of charge carriers directly from the photodetection region into a charge carrier storage region during a detection period.

An integrated circuit may comprise: a photodetection region configured to receive incident photons, the photodetection region being configured to produce a plurality of charge carriers in response to the incident photons; and a charge carrier storage region, wherein the integrated circuit is configured to: (A) aggregate first photogenerated charge carriers in the charge carrier storage region over a plurality of first detection periods following first respective trigger events, the plurality of first detection periods individually having a first timing with respective to the first respective trigger events; (B) read out a first signal indicative of charge stored in the charge carrier storage region following (A); (C) aggregate second photogenerated charge carriers in the charge carrier storage region over a plurality of second detection periods following second respective trigger events, the plurality of second detection periods individually having a second timing with respective to the second respective trigger events; and (D) read out a second signal indicative of charge stored in the charge carrier storage region following (C).

The plurality of first detection periods may have different start times, end times and/or durations than the plurality of second detection periods.

The integrated circuit may be configured to repeat at least (A) through (D) a plurality of times.

The integrated circuit may be configured to calculate an average value of the first signal and an average value of the second signal based on the first signals and second signals read out from repeating (A) through (D) the plurality of times.

The integrated circuit may be configured to identify at least a portion of a molecule based at least in part on the average value of the first signal and the average value of the second signal.

The integrated circuit may be further configured to: (E) aggregate third photogenerated charge carriers in the charge carrier storage region over a plurality of third detection periods following respective third trigger events, the plurality of third detection periods individually having a third timing with respective to the respective third trigger events; and (F) read out a third signal indicative of charge stored in the charge carrier storage region following (E), wherein the integrated circuit is configured to repeat at least (A) through (F) a plurality of times.

The charge carrier storage region may be a single charge carrier storage region.

The charge carrier storage region may be a first charge carrier storage region, and a pixel may comprise the first charge carrier storage region and a second charge carrier storage region that receives charge from the first charge carrier storage region.

A photodetection method may comprise: (A) aggregating first photogenerated charge carriers in a charge carrier storage region over a plurality of first detection periods following first respective trigger events, the plurality of first detection periods individually having a first timing with respective to the first respective trigger events; (B) reading out a first signal indicative of charge stored in the charge carrier storage region following (A); (C) aggregating second photogenerated charge carriers in the charge carrier storage region over a plurality of second detection periods following second respective trigger events, the plurality of second detection periods individually having a second timing with respective to the second respective trigger events; and (D) reading out a second signal indicative of charge stored in the charge carrier storage region following (C).

An integrated circuit, may comprise: a photodetection region configured to receive incident photons, the photodetection region being configured to produce a plurality of charge carriers in response to the incident photons; and a charge carrier storage region, wherein the integrated circuit is configured to: aggregate, in a charge storage region, first charge carriers received by a photodetection region within a first time period with respect to first trigger events; aggregate, in the charge storage region, second charge carriers received by the photodetection region within a second time period with respect to second trigger events; and read out signals representative of a first quantity of the first charge carriers and a second quantity of the second charge carriers; and analyze the first and second charge carriers to obtain a temporal characteristic of light received by the photodetection region.

The integrated circuit may be further configured to comprising analyze the temporal characteristic to identify at least a portion of a molecule associated with emission of the light.

A method may comprise: aggregating, in a charge storage region, first charge carriers received by a photodetection region within a first time period with respect to first trigger events; aggregating, in the charge storage region, second charge carriers received by the photodetection region within a second time period with respect to second trigger events; and reading out signals representative of a first quantity of the first charge carriers and a second quantity of the second charge carriers; and analyzing the first and second charge carriers to obtain a temporal characteristic of light received by the photodetection region.

The method may further comprise analyzing the temporal characteristic to identify at least a portion of a molecule associated with emission of the light.

A photodetection method includes: (A) aggregating first photogenerated charge carriers in a charge carrier storage region over a plurality of first detection periods following respective trigger events, the plurality of first detection periods individually having a first duration; (B) reading out charge stored in the charge carrier storage region following (A); (C) aggregating second photogenerated charge carriers in the charge carrier storage region over a plurality of second detection periods following respective trigger events, the plurality of second detection periods individually having a second duration, wherein the first duration is different from the second duration; and (D) reading out charge stored in the charge carrier storage region following (C).

An integrated circuit includes a photodetection region configured to receive incident photons, the photodetection region being configured to produce a plurality of charge carriers in response to the incident photons; and a charge carrier storage region. The integrated circuit is configured to: (A) aggregate first photogenerated charge carriers in a charge carrier storage region over a plurality of first detection periods following respective trigger events, the plurality of first detection periods individually having a first duration; (B) read out charge stored in the charge carrier storage region following (A); (C) aggregate second photogenerated charge carriers in the charge carrier storage region over a plurality of second detection periods following respective trigger events, the plurality of second detection periods individually having a second duration, wherein the first duration is different from the second duration; and (D) read out charge stored in the charge carrier storage region following (C).

The first duration may be less than half and more than one fifth of the second duration.

The first detection periods and the second detection periods may start at a same time relative to the trigger events.

An integrated circuit includes a photodetection region configured to receive incident photons, the photodetection region being configured to produce a plurality of charge carriers in response to the incident photons; a charge carrier storage region; and a charge carrier segregation structure configured to selectively direct charge carriers of the plurality of charge carriers into a charge carrier rejection region or directly into the charge carrier storage region based upon times at which the charge carriers are produced.

A photodetection method includes (A) receiving incident photons at a photodetection region; and (B) selectively directing charge carriers of the plurality of charge carriers into a charge carrier rejection region or directly into the charge carrier storage region based upon times at which the charge carriers are produced.

An integrated circuit includes a photodetection region configured to receive incident photons, the photodetection region being configured to produce a plurality of charge carriers in response to the incident photons; a charge carrier storage region; and a charge carrier segregation structure configured to selectively direct charge carriers of the plurality of charge carriers into a charge carrier rejection region during a rejection period or into the charge carrier storage region during a detection period, wherein the charge carrier segregation structure is controlled to vary the detection period.

A photodetection method includes (A) receiving incident photons at a photodetection region; and (B) selectively directing charge carriers of the plurality of charge carriers into a charge carrier rejection region during a rejection period or into the charge carrier storage region during a detection period; and (C) varying the detection period.

The integrated circuit may further comprise a direct binning pixel, the direct binning pixel comprising the photodetection region, the charge carrier storage region and the charge carrier segregation structure.

The integrated circuit may comprise a plurality of direct binning pixels.

The charge carrier storage region may be configured to aggregate charge carriers produced in a first plurality of measurement periods, the first plurality of measurement periods having a first detection period.

The charge carrier storage region may be configured to aggregate charge carriers produced in a second plurality of measurement periods, the second plurality of measurement periods having a second detection period of different duration from that of the first measurement periods.

A first frame may include the first plurality of measurement periods and a first readout of the charge carrier storage region and a second frame includes the second plurality of measurement periods and a second readout of the charge carrier storage region.

The charge carrier segregation structure may be controlled to alternate between the first frame and the second frame.

The charge carrier segregation structure may include at least one electrode at a boundary between the photodetection region and the charge carrier storage region.

The charge carrier segregation structure may include a single electrode at the boundary between the photodetection region and the first charge carrier storage region.

In some cases, no charge carrier capture region is present between the photodetection region and a charge carrier storage region of the at least one charge carrier storage region.

Charge carriers may be transferred to the charge carrier storage region without capturing the carriers between the photodetection region and charge carrier storage region.

Discarded charge carriers may be removed from the photodetection region in a different direction from a direction in which carriers are directed from the photodetection region toward the charge carrier storage region.

The charge carrier rejection region may discard charge carriers produced in the photodetection region during a rejection period by changing a voltage of an electrode at a boundary between the photodetection region and the charge carrier rejection region.

Single electrons may be transferred to the charge carrier storage region and aggregated in the at least one charge carrier storage region.

The charge carrier storage region may constitute a single time bin for the photodetection region.

The integrated circuit may further comprise a readout region for storing the charge from the single time bin for readout.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 8A shows a cross-sectional view of a direct binning pixel in which the bin is formed by a readout node. FIG. 8B shows a plan view of the direct binning pixel of FIG. 8A.

FIGS. 10-14 show an exemplary process of forming the photodetector and four different pixel designs n0-n3. FIG. 10 shows a first level, FIG. 11 shows a second level, FIG. 12 shows a third level, FIG. 13 shows a fourth level and FIG. 14 shows a fifth level.

DETAILED DESCRIPTION

Figure 1:
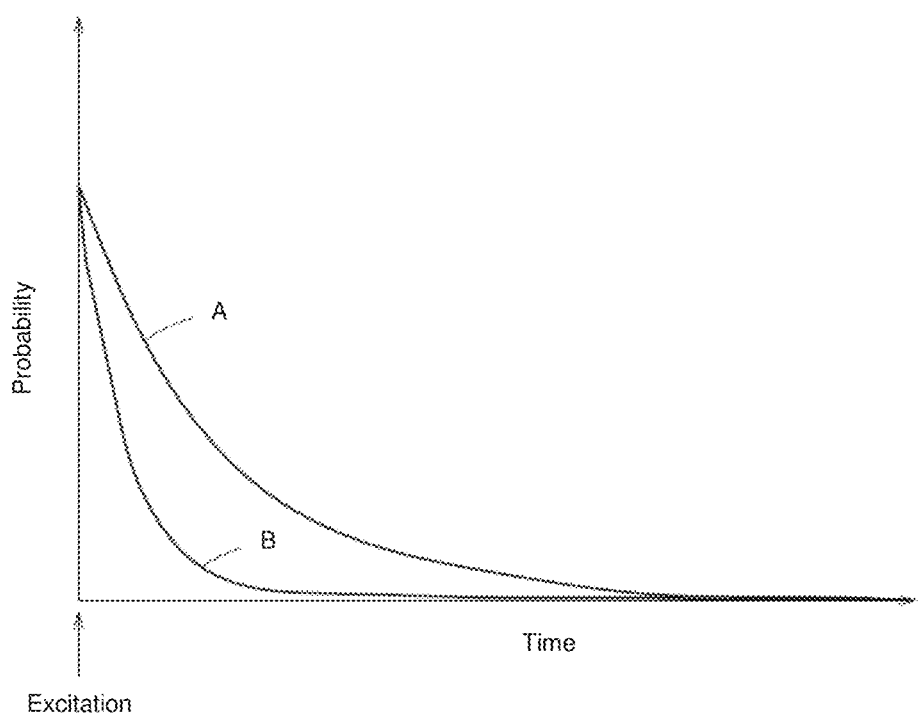
FIG. 1 plots the probability of a photon being emitted as a function of time for two markers with different lifetimes.

Described herein is an integrated photodetector that can accurately measure, or "time-bin," the timing of arrival of incident photons. In some embodiments, the integrated photodetector can measure the arrival of photons with nanosecond or picosecond resolution. Such a photodetector may find application in a variety of applications including molecular detection/quantitation, which may be applied to sequencing of nucleic acids (e.g., DNA sequencing). Such a photodetector can facilitate time-domain analysis of the arrival of incident photons from luminescent molecules used to label nucleotides, thereby enabling identification and sequencing of nucleotides based upon luminance lifetimes. Other examples of applications of the integrated photodetector include fluorescence lifetime imaging and time-of-flight imaging, as discussed further below.

Discussion of Time Domain Measurements for Molecular Detection/Quantitation

Detection and quantitation of biological samples may be performed using biological assays ("bioassays"). Bioassays conventionally involve large, expensive laboratory equipment requiring research scientists trained to operate the equipment and perform the bioassays. Bioassays are conventionally performed in bulk such that a large amount of a particular type of sample is necessary for detection and quantitation. Some bioassays are performed by tagging samples with luminescent markers that emit light of a particular wavelength. The samples are illuminated with a light source to cause luminescence, and the luminescent light is detected with a photodetector to quantify the amount of light emitted by the markers. Bioassays using luminescent tags and/or reporters conventionally involve expensive laser light sources to illuminate samples and complicated luminescent detection optics and electronics to collect the light from the illuminated samples.

In some embodiments, an integrated photodetector as described herein can detect the luminance characteristics of biological and/or chemical sample(s) in response to excitation. More specifically, such an integrated photodetector can detect the temporal characteristics of light received from the sample(s). Such an integrated photodetector can enable detecting and/or discriminating the luminance lifetime, e.g., the fluorescence lifetime, of light emitted by a luminescent molecule in response to excitation. In some embodiments, identification and/or quantitative measurements of sample(s) can be performed based on detecting and/or discriminating luminance lifetimes. For example, in some embodiments sequencing of a nucleic acid (e.g., DNA, RNA) may be performed by detecting and/or discriminating luminance lifetimes of luminescent molecules attached to respective nucleotides. Each luminescent molecule may be directly attached (e.g., bonded) to a corresponding nucleotide or indirectly attached to a corresponding nucleotide via a linker molecule that is bonded to the nucleotide and the luminescent molecule.

In some embodiments, an integrated photodetector having a number of photodetection structures and associated electronics, termed "pixels," can enable measurement and analysis of a plurality of samples in parallel (e.g., hundreds, thousands, millions or more), which can reduce the cost of performing complex measurements and rapidly advance the rate of discoveries. In some embodiments, each pixel of the photodetector may detect light from a sample, which may be a single molecule or more than one molecule. In some embodiments, such an integrated photodetector can be used for dynamic real time applications such as nucleic acid (e.g., DNA, RNA) sequencing.

Detection/Quantitation of Molecules Using Luminance Lifetimes

An integrated circuit having an integrated photodetector according to aspects of the present application may be designed with suitable functions for a variety of detection and imaging applications. As described in further detail below, such an integrated photodetector can have the ability to detect light within a detection time period, also termed a "detection period" or "time bin." To collect information regarding the time of arrival of the light, charge carriers are generated in response to incident photons and can be directed into a time bin based on their time of arrival.

An integrated photodetector according to some aspects of the present application may be used for differentiating among light emission sources, including luminescent molecules, such as fluorophores. Luminescent molecules vary in the wavelength of light they emit, the temporal characteristics of the light they emit (e.g., their emission decay time periods), and their response to excitation energy. Accordingly, luminescent molecules may be identified or discriminated from other luminescent molecules based on detecting these properties. Such identification or discrimination techniques may be used alone or in any suitable combination.

In some embodiments, an integrated photodetector as described in the present application can measure or discriminate luminance lifetimes, such as fluorescence lifetimes. Fluorescence lifetime measurements are based on exciting one or more fluorescent molecules, and measuring the time variation in the emitted luminescence. The probability of a fluorescent molecule to emit a photon after the fluorescent molecule reaches an excited state decreases exponentially over time. The rate at which the probability decreases may be characteristic of a fluorescent molecule, and may be different for different fluorescent molecules. Detecting the temporal characteristics of light emitted by fluorescent molecules may allow identifying fluorescent molecules and/or discriminating fluorescent molecules with respect to one another. Luminescent molecules are also referred to herein as luminescent markers, or simply "markers."

After reaching an excited state, a marker may emit a photon with a certain probability at a given time. The probability of a photon being emitted from an excited marker may decrease over time after excitation of the marker. The decrease in the probability of a photon being emitted over time may be represented by an exponential decay function $p(t)=e^{-t/\tau}$, where p(t) is the probability of photon emission at a time, t, and $\tau$ is a temporal parameter of the marker. The temporal parameter $\tau$ indicates a time after excitation when the probability of the marker emitting a photon is a certain value. The temporal parameter, $\tau$, is a property of a marker that may be distinct from its absorption and emission spectral properties. Such a temporal parameter, $\tau$, is referred to as the luminance lifetime, the fluorescence lifetime or simply the "lifetime" of a marker.

FIG. 1 plots the probability of a photon being emitted as a function of time for two markers with different lifetimes. The marker represented by probability curve B has a probability of emission that decays more quickly than the probability of emission for the marker represented by probability curve A. The marker represented by probability curve B has a shorter temporal parameter, $\tau$, or lifetime than the marker represented by probability curve A. Markers may have fluorescence lifetimes ranging from 0.1-20 ns, in some embodiments. However, the techniques described herein are not limited as to the lifetimes of the marker(s) used.

The lifetime of a marker may be used to distinguish among more than one marker, and/or may be used to identify marker(s). In some embodiments, fluorescence lifetime measurements may be performed in which a plurality of markers having different lifetimes are excited by an excitation source. As an example, four markers having lifetimes of 0.5, 1, 2, and 3 nanoseconds, respectively, may be excited by a light source that emits light having a selected wavelength (e.g., 635 nm, by way of example). The markers may be identified or differentiated from each other based on measuring the lifetime of the light emitted by the markers. However, the lifetime itself need not be calculated, as other temporal characteristics of the light emitted by markers may be used to distinguish between them.

Fluorescence lifetime measurements may use relative intensity measurements by comparing how intensity changes over time, as opposed to absolute intensity values. As a result, fluorescence lifetime measurements may avoid some of the difficulties of absolute intensity measurements. Absolute intensity measurements may depend on the concentration of fluorophores present and calibration steps may be needed for varying fluorophore concentrations. By contrast, fluorescence lifetime measurements may be insensitive to the concentration of fluorophores.

Luminescent markers may be exogenous or endogenous. Exogenous markers may be external luminescent markers used as a reporter and/or tag for luminescent labeling. Examples of exogenous markers may include fluorescent molecules, fluorophores, fluorescent dyes, fluorescent stains, organic dyes, fluorescent proteins, enzymes, and/or quantum dots. Such exogenous markers may be conjugated to a probe or functional group (e.g., molecule, ion, and/or ligand) that specifically binds to a particular target or component. Attaching an exogenous tag or reporter to a probe allows identification of the target through detection of the presence of the exogenous tag or reporter. Examples of probes may include proteins, nucleic acids such as DNA molecules or RNA molecules, lipids and antibody probes. The combination of an exogenous marker and a functional group may form any suitable probes, tags, and/or labels used for detection, including molecular probes, labeled probes, hybridization probes, antibody probes, protein probes (e.g., biotin-binding probes), enzyme labels, fluorescent probes, fluorescent tags, and/or enzyme reporters.

While exogenous markers may be added to a sample or region, endogenous markers may be already part of the sample or region. Endogenous markers may include any luminescent marker present that may luminesce or "autofluoresce" in the presence of excitation energy. Autofluorescence of endogenous fluorophores may provide for label-free and noninvasive labeling without requiring the introduction of endogenous fluorophores. Examples of such endogenous fluorophores may include hemoglobin, oxyhemoglobin, lipids, collagen and elastin crosslinks, reduced nicotinamide adenine dinucleotide (NADH), oxidized flavins (FAD and FMN), lipofuscin, keratin, and/or prophyrins, by way of example and not limitation.

Differentiating between markers by lifetime measurements may allow for fewer wavelengths of excitation light to be used than when the markers are differentiated by measurements of emission spectra. In some embodiments, sensors, filters, and/or diffractive optics may be reduced in number or eliminated when using fewer wavelengths of excitation light and/or luminescent light. In some embodiments, labeling may be performed with markers that have different lifetimes, and the markers may be excited by light having the same excitation wavelength or spectrum. In some embodiments, an excitation light source may be used that emits light of a single wavelength or spectrum, which may reduce the cost. However, the techniques described herein are not limited in this respect, as any number of excitation light wavelengths or spectra may be used. In some embodiments, an integrated photodetector may be used to determine both spectral and temporal information regarding received light. In some embodiments a quantitative analysis of the types of molecule(s) present may be performed by determining a temporal parameter, an intensity parameter, a spectral parameter, or a combination of parameters of the emitted luminescence from a marker.

An integrated photodetector that detects the arrival time of incident photons may reduce additional optical filtering (e.g., optical spectral filtering) requirements. As described below, an integrated photodetector according to the present application may include a drain to remove photogenerated carriers at particular times. By removing photogenerated carriers in this manner, unwanted charge carriers produced in response to an excitation light pulse may be discarded without the need for optical filtering to prevent reception of light from the excitation pulse. Such a photodetector may reduce overall design integration complexity, optical and/or filtering components, and/or cost.

In some embodiments, a fluorescence lifetime may be determined by measuring the time profile of the emitted luminescence by aggregating collected charge carriers in one or more time bins of the integrated photodetector to detect luminance intensity values as a function of time. In some embodiments, the lifetime of a marker may be determined by performing multiple measurements where the marker is excited into an excited state and then the time when a photon emits is measured. For each measurement, the excitation source may generate a pulse of excitation light directed to the marker, and the time between the excitation pulse and subsequent photon event from the marker may be determined. Additionally or alternatively, when an excitation pulse occurs repeatedly and periodically, the time between when a photon emission event occurs and the subsequent excitation pulse may be measured, and the measured time may be subtracted from the time interval between excitation pulses (i.e., the period of the excitation pulse waveform) to determine the time of the photon absorption event.

By repeating such experiments with a plurality of excitation pulses, the number of instances a photon is emitted from the marker within a certain time interval after excitation may be determined, which is indicative of the probability of a photon being emitted within such a time interval after excitation. The number of photon emission events collected may be based on the number of excitation pulses emitted to the marker. The number of photon emission events over a measurement period may range from 50-10,000,000 or more, in some embodiments, however, the techniques described herein are not limited in this respect. The number of instances a photon is emitted from the marker within a certain time interval after excitation may populate a histogram representing the number of photon emission events that occur within a series of discrete time intervals. A curve fitting algorithm may be used to fit a curve to the recorded histogram, resulting in a function representing the probability of a photon to be emitted after excitation of the marker at a given time. An exponential decay function, such as $p(t)=e^{-t/\tau}$, may be used to approximately fit the histogram data. From such a curve fitting, the temporal parameter or lifetime may be determined. The determined lifetime may be compared to known lifetimes of markers to identify the type of marker present. However, as mentioned above, the lifetime of a marker need not be calculated, as other temporal characteristics may be used to distinguish between markers, such as temporal characteristics that are measured directly or otherwise derived from measurements.

In some instances, the probability of a photon emission event and thus the lifetime or other temporal characteristics of a marker may change based on the surroundings and/or conditions of the marker. For example, the lifetime of a marker confined in a volume with a diameter less than the wavelength of the excitation light may be smaller than when the marker is not in the volume. Lifetime measurements with known markers under conditions similar to when the markers are used for labeling may be performed. The lifetimes determined from such measurements with known markers may be used when identifying a marker.

Sequencing Using Luminance Lifetime Measurements

Individual pixels of an integrated photodetector may be capable of fluorescence lifetime measurements used to identify fluorescent tags and/or reporters that label one or more targets, such as molecules or specific locations on molecules. Any one or more molecules of interest may be labeled with a fluorophore, including proteins, amino acids, enzymes, lipids, nucleotides, DNA, and RNA. When combined with detecting spectra of the emitted light or other labeling techniques, fluorescence lifetime may increase the total number of fluorescent tags and/or reporters that can be used. Identification based on lifetime may be used for single molecule analytical methods to provide information about characteristics of molecular interactions in complex mixtures where such information would be lost in ensemble averaging and may include protein-protein interactions, enzymatic activity, molecular dynamics, and/or diffusion on membranes. Additionally, fluorophores with different fluorescence lifetimes may be used to tag target components in various assay methods that are based on presence of a labeled component. In some embodiments, components may be separated, such as by using microfluidic systems, based on detecting particular lifetimes of fluorophores.

Measuring fluorescence lifetimes may be used in combination with other analytical methods. For an example, fluorescence lifetimes may be used in combination with fluorescence resonance energy transfer (FRET) techniques to discriminate between the states and/or environments of donor and acceptor fluorophores located on one or more molecules. Such measurements may be used to determine the distance between the donor and the acceptor. In some instances, energy transfer from the donor to the acceptor may decrease the lifetime of the donor. In another example, fluorescence lifetime measurements may be used in combination with DNA sequencing techniques where four fluorophores having different lifetimes may be used to label the four different nucleotides (A, T, G, C) in a DNA molecule with an unknown sequence of nucleotides. The fluorescence lifetimes, instead of emission spectra, of the fluorophores may be used to identify the sequence of nucleotides. By using fluorescence lifetime or another temporal characteristic instead of emission spectra for certain techniques, accuracy and measurement resolution may increase because artifacts due to absolute intensity measurements are reduced. Additionally, lifetime measurements may reduce the complexity and/or expense of the system because fewer excitation energy wavelengths are required and/or fewer emission energy wavelengths need be detected.

The methods described herein may be used for sequencing of nucleic acids, such as DNA sequencing or RNA sequencing. DNA sequencing allows for the determination of the order and position of nucleotides in a target nucleic acid molecule. Technologies used for DNA sequencing vary greatly in the methods used to determine the nucleic acid sequence as well as in the rate, read length, and incidence of errors in the sequencing process. A number of DNA sequencing methods are based on sequencing by synthesis, in which the identity of a nucleotide is determined as the nucleotide is incorporated into a newly synthesized strand of nucleic acid that is complementary to the target nucleic acid. Many sequencing by synthesis methods require the presence of a population of target nucleic acid molecules (e.g., copies of a target nucleic acid) or a step of amplification of the target nucleic acid to achieve a population of target nucleic acids. Improved methods for determining the sequence of single nucleic acid molecules is desired.

There have been recent advances in sequencing single nucleic acid molecules with high accuracy and long read length. The target nucleic acid used in single molecule sequencing technology, for example the SMRT technology developed by Pacific Biosciences, is a single stranded DNA template that is added to a sample well containing at least one component of the sequencing reaction (e.g., the DNA polymerase) immobilized or attached to a solid support such as the bottom of the sample well. The sample well also contains deoxyribonucleoside triphosphates, also referred to a "dNTPs," including adenine, cytosine, guanine, and thymine dNTPs, that are conjugated to detection labels, such as fluorophores. Preferably each class of dNTPs (e.g. adenine dNTPs, cytosine dNTPs, guanine dNTPs, and thymine dNTPs) are each conjugated to a distinct detection label such that detection of the signal indicates the identity of the dNTP that was incorporated into the newly synthesized nucleic acid. The detection label may be conjugated to the dNTP at any position such that the presence of the detection label does not inhibit the incorporation of the dNTP into the newly synthesized nucleic acid strand or the activity of the polymerase. In some embodiments, the detection label is conjugated to the terminal phosphate (the gamma phosphate) of the dNTP.

Any polymerase may be used for single molecule DNA sequencing that is capable of synthesizing a nucleic acid complementary to a target nucleic acid. Examples of polymerases include E. coli DNA polymerase I, T7 DNA polymerase, bacteriophage T4 DNA polymerase φ29 (psi29) DNA polymerase, and variants thereof. In some embodiments, the polymerase is a single subunit polymerase. Upon base pairing between a nucleobase of a target nucleic acid and the complementary dNTP, the polymerase incorporates the dNTP into the newly synthesized nucleic acid strand by forming a phosphodiester bond between the 3' hydroxyl end of the newly synthesized strand and the alpha phosphate of the dNTP. In examples in which the detection label conjugated to the dNTP is a fluorophore, its presence is signaled by excitation and a pulse of emission is detected during the step of incorporation. For detection labels that are conjugated to the terminal (gamma) phosphate of the dNTP, incorporation of the dNTP into the newly synthesized strand results in release the beta and gamma phosphates and the detection label, which is free to diffuse in the sample well, resulting in a decrease in emission detected from the fluorophore.

The techniques described herein are not limited as to the detection or quantitation of molecules or other samples, or to performing sequencing. In some embodiments, an integrated photodetector may perform imaging to obtain spatial information regarding a region, object or scene and temporal information regarding the arrival of incident photons using the region, object or scene. In some embodiments, the integrated photodetector may perform luminescence lifetime imaging of a region, object or sample, such as fluorescence lifetime imaging.

Integrated Photodetector for Time Binning Photogenerated Charge Carriers

Some embodiments relate to an integrated circuit having a photodetector that produces charge carriers in response to incident photons and which is capable of discriminating the timing at which the charge carriers are generated. In some embodiments, the integrated circuit may have a single bin (also termed "bin," "charge storage bin" or "charge carrier storage region") for time-binning charge carriers produced in the photodetection region. Charge carriers generated during a detection period are transferred to the bin. Charge carriers generated outside of the detection period are not transferred to the bin. As mentioned above, measurements may be repeated a number of times, and the bin may aggregate charge carriers received within the detection period over a plurality of measurements. The amount of charge stored is then read out. Following read out, the timing of the detection period may be changed, and after re-setting the bin another set of measurements may be performed with a different detection period timing. Charge carriers are then aggregated over another plurality of measurements and the stored charge is again read out. The amount of charge collected in different detection periods can provide information about the timing and/or the intensity of light received by the photodetector. Timing information regarding the time of arrival of photons with respect to a reference time can be obtained from a single bin by altering its detection period timing. Such an integrated circuit can be used in any of a variety of applications, such as those described herein. Examples of an integrated circuit having a direct binning pixel with a single bin are described. In some embodiments, the integrated circuit may include an array of such pixels.

Direct Binning Pixel

Figure 2:
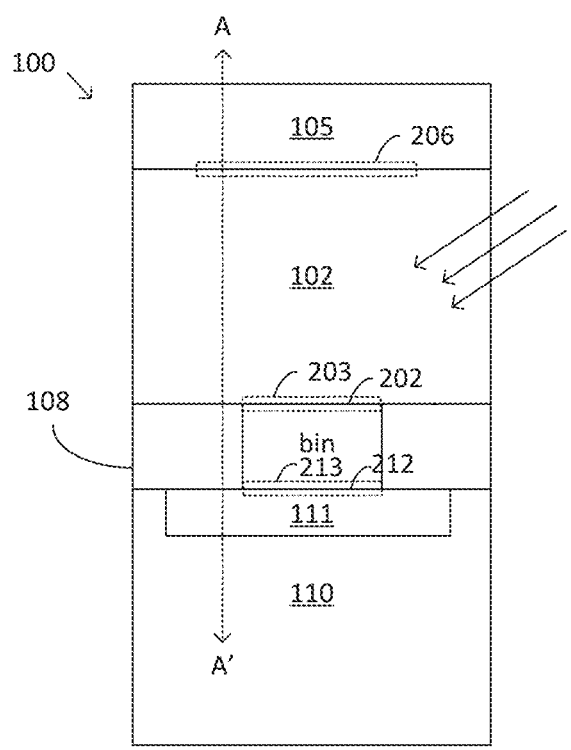
FIG. 2 shows an example of a direct binning pixel.

FIG. 2 shows an example of a pixel 100 in which charge carriers generated in the photon absorption/carrier generation region 102 (also termed a "photodetection region") may be directly transferred to a charge storage bin in charge carrier storage region 108, without an intermediate charge carrier capture region between them. Such a pixel is termed a "direct binning pixel." The bin may be a single bin, with no other bins being configured to receive charge carriers directly from the photon absorption/carrier generation region 102. FIG. 2 shows an example of a pixel 100 having a single bin in charge carrier storage region 108. Advantages of a single bin pixel over a multi-bin pixel may include improved rejection of excitation light, simplification of design by the reduction of complexity, and lower power consumption due to the need to drive fewer electrodes. The bin may aggregate charge carriers received in a detection period following a reference time or trigger event. Also, as discussed further below, one or more additional storage regions may be present to receive the charge stored in the bin for purposes of readout. For example, transferring the charge stored in the bin to another charge storage region for readout may allow for simultaneous use of the bin for receiving charge carriers and another charge storage region for holding the charge while it is read out.

The pixel 100 may include a semiconductor region, which may be formed of any suitable semiconductor, such as silicon, for example. FIG. 2 shows a plan view with the semiconductor region underneath, and electrodes 206, 203 and 213 formed over the top of the semiconductor region. A charge carrier segregation structure including electrodes 206 and 203 selectively directs photogenerated charge carriers to the bin or to a rejection region 105 at different times. In some embodiments, the photon absorption/carrier generation region 102 may include a photodiode, such as a pinned photodiode, formed in the semiconductor region. The photodiode may be fully depleted. In some embodiments, the photodiode may remain essentially depleted of electrons at all times. In some embodiments, the photodiode is configured to collect single photons. In such embodiments, a single photoelectron may be generated and confined in the photodiode. If formed by a CMOS process, the photodiode may be fully depleted by potentials available within devices produced by a CMOS process. In some embodiments, electrode 203 may be coupled to the diode at least partially surrounding the perimeter of the diode. The electrode 203 may allow rapid charge transfer of confined carriers. Prior to discussing transfer of charge carriers to the bin, the rejection of unwanted carriers by transfer of the unwanted carriers into a rejection region 105 will be described.

Referring again to FIG. 2, direct binning pixel 100 may include a rejection region 105 to drain or otherwise discard charge carriers produced in photon absorption/carrier generation region 102 during a rejection period. A rejection period may be timed to occur during a trigger event, such as an excitation light pulse. Since an excitation light pulse may produce a number of unwanted charge carriers in photon absorption/carrier generation region 102, a potential gradient may be established in pixel 100 to drain such charge carriers to rejection region 105 during a rejection period. As an example, rejection region 105 may include a high potential diffusion area where electrons are drained to a supply voltage. Rejection region 105 may include an electrode 206 that charge couples region 102 directly to rejection region 105. In some embodiments, the electrode 206 may overlie the semiconductor region. The voltage of the electrode 206 may be varied to establish a desired potential gradient in photon absorption/carrier generation region 102. During a rejection period, the voltage of the electrode 206 may be set to a level that draws carriers from the photon absorption/carrier generation region 102 into the electrode 206, and out to the supply voltage. For example, the voltage of the electrode 206 may be set to a positive voltage to attract electrons, such that they are drawn away from the photon absorption/carrier generation region 102 to rejection region 105. During a rejection period, electrode 203 may be set to a potential that forms a potential barrier 202 to prevent the unwanted charge carriers from reaching the bin. Rejection region 105 may be considered a "lateral rejection region" because it allows transferring carriers laterally from region 102 to a drain. In some embodiments, the rejection is in the opposite direction (upwards in FIG. 2) from the photodetection region 102 with respect to the direction of transfer (downwards in FIG. 2) of charge carriers from the photodetection region 102 to the bin. The relative positions of the rejection region 105 and collection region 108 are not limited to opposite sides of the photodiode 102; however.

Following the rejection period, a photogenerated charge carrier produced in photon absorption/carrier generation region 102 may be transferred to the bin. During a detection period, a potential barrier 202 formed by electrode 203 may be lowered, a potential barrier formed by electrode 206 may be raised, and the electrical potential within the semiconductor region between photon absorption/carrier generation region 102 and charge carrier storage region 108 may be establish a potential gradient that causes the photogenerated charge carrier(s) to be directed to the bin. At the end of the detection period the potential barrier 202 is raised to prevent further charge carriers from being transferred into the bin. Accordingly, the bin stores the charge carriers received in the bin during the detection period. The stored charge may then be read out, as discussed further below.

In some embodiments, only a single electrode 203 may be disposed at the boundary between region 102 and the bin to control the potential barrier 202 that allows or prevents transfer of a charge carrier to the bin. However, in some embodiments, the potential barrier 202 may be produced by more than one electrode. The electrode(s) 203 may control a potential barrier 202 to either allow or prevent a charge carrier from entering the bin. The potential barrier 202 may be a single potential barrier between region 102 and the bin.

Figure 3:
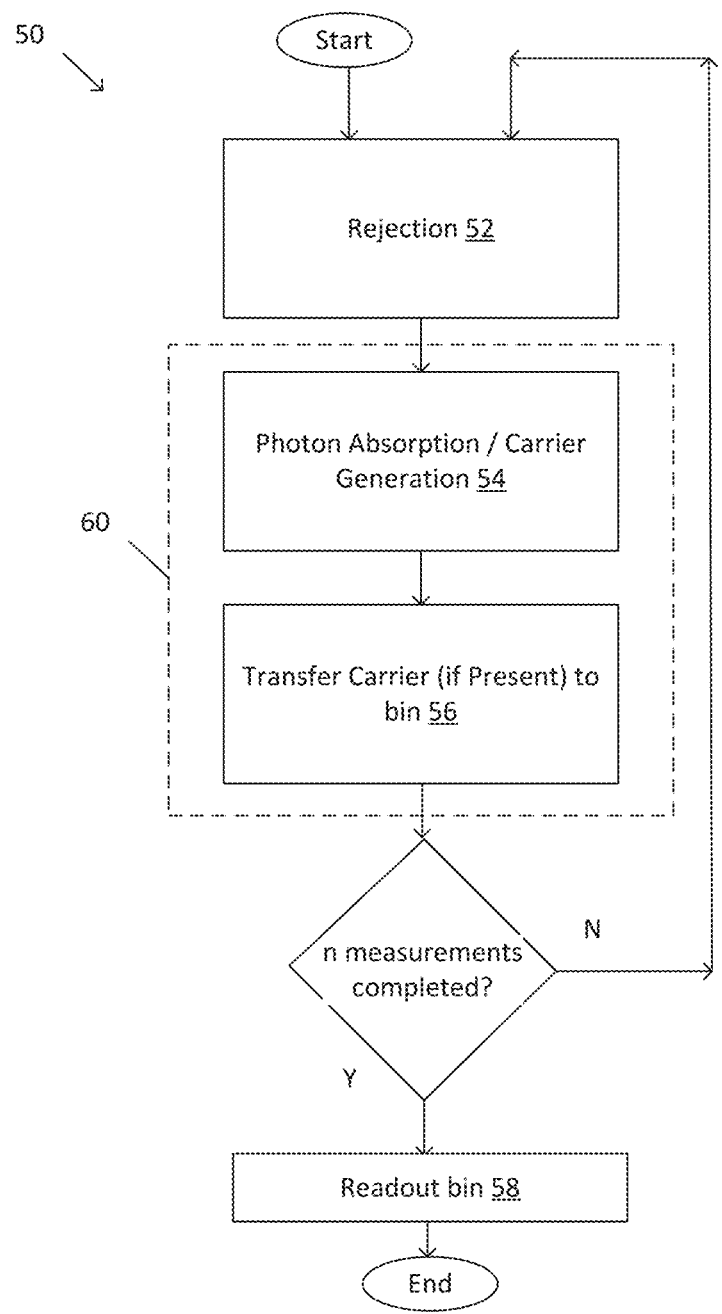
FIG. 3 shows a flowchart of a method of operating a direct binning pixel.

FIG. 3 shows a flowchart of a method 50 of operating pixel 100 that includes performing a plurality of alternating carrier rejection steps 52 and detection steps 60, followed by a readout step 58.

Figure 4A:
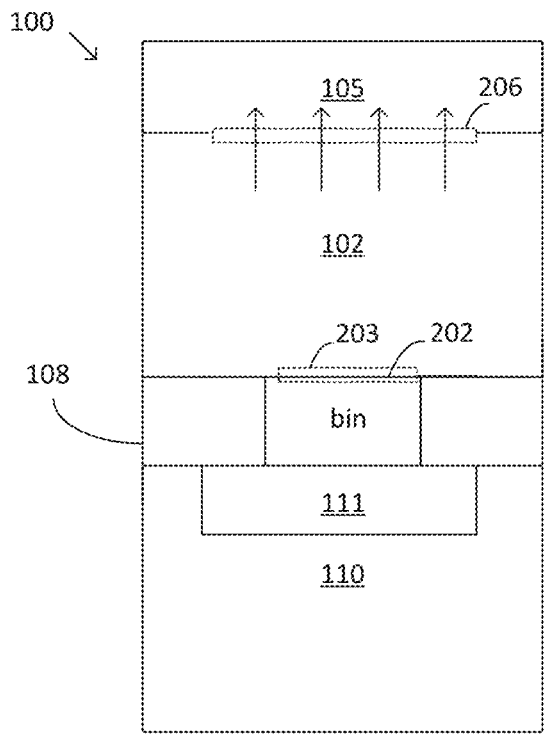
FIG. 4A-C show the direct binning pixel at various stages of the method of FIG. 3.

The operation of pixel 100 during rejection step 52 is illustrated in FIG. 4A. The rejection step 52 occurs for a rejection period. In rejection step 52, the pixel 100 is operated to reject charge carriers produced in region 102 by transferring them to rejection region 105. For example, rejection step 52 may include controlling electrode 206 to produce a potential gradient that drives charge carriers produced in region 102 to rejection region 105. Carriers are rejected by directing them in the upward direction of FIG. 4A. The potential barrier 202 to the bin is raised to prevent unwanted charge from entering the bin.

Rejection step 52 may be timed to occur during a trigger event. A trigger event may be an event that serves as a time reference for time binning arrival of a photon. The trigger event may be an optical pulse or an electrical pulse, for example, and could be a singular event or a repeating, periodic event. In the context of luminance lifetime detection, the trigger event may be the generation or reception of an excitation light pulse to excite a luminescent molecule, such as a fluorophore. In the context of time-of-flight imaging, the trigger event may be a pulse of light (e.g., from a flash) emitted by an imaging device comprising the integrated photodetector. The trigger event can be any event used as a reference for timing the arrival of photons or carriers.

The generation of an excitation light pulse may produce a significant number of photons, some of which may reach the pixel 100 and may produce charge carriers in the photon absorption/carrier generation area 102. Since photogenerated carriers from the excitation light pulse are not desired to be measured, they may be rejected by directing them to a drain in rejection step 52. This can reduce the amount of unwanted signal that otherwise may need to be prevented from arriving by complex optical components, such as a shutter or filter, which may add additional design complexity and/or cost.

Figure 4B:
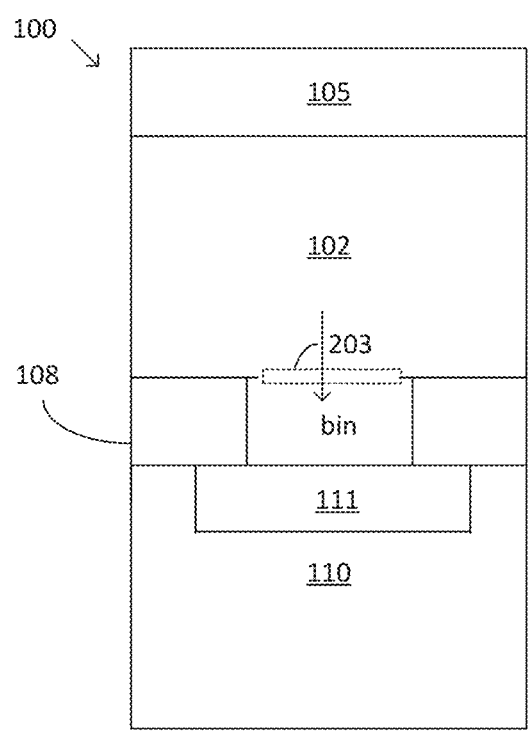

Returning to discussion of FIG. 3, a detection step 60 follows the rejection step 52. As illustrated in FIG. 4B, detection step 60 may include raising a potential barrier to the rejection region 105 (e.g., by modifying the voltage of electrode 206) to prevent photogenerated charge carriers from being discarded. The raising of the potential barrier to the rejection region 105 is the beginning of detection step 60, which has a duration termed a detection period. At the same time or subsequent to the raising of the potential barrier to the rejection region 105, the detection step 60 includes the lowering of potential barrier 202 (e.g., by modifying the voltage of electrode 203) between the region 102 and the bin for a period of time in which charge carriers are allowed to pass from region 102 to the bin. If the potential barrier 202 is lowered subsequent to the raising of the potential barrier to the rejection region 105 any charge carriers photogenerated in the photodetection region 102 remain in the photodetection region 102 until the potential barrier 202 is lowered, and then these charge carriers pass into the bin. Accordingly, the detection period includes both the period of time the potential barrier 202 is lowered as well any period following the raising of the potential barrier to the rejection region 105 before the potential barrier 202 is lowered. A photon may or may not arrive in photodetection region 102 during detection step 60. If a photon arrives in photodetection region 102 and a photogenerated charge carrier is produced (step 54) during the detection period, a potential gradient causes the charge carrier to be directed into the bin (step 56), as illustrated in FIG. 4B. Such a potential gradient may be established in any suitable way, such as using a graded doping concentration and/or one or more electrodes at selected potentials. Then, the potential barrier 202 is raised at the end of the detection period to prevent further charge carriers from being transferred to the bin, which marks the end of the detection period. If a photogenerated charge carrier is produced in region 102 while the potential barrier 202 to the bin is raised, a charge carrier may be confined in region 102 until rejection step 52 occurs again and the charge carrier is discarded. Accordingly, the bin collects the photogenerated charge carriers produced in region 102 during a detection period.

As discussed above, in some applications the probability of receiving a photon and generating a carrier in response to a trigger event may be low (e.g., about 1 in 10,000). Accordingly, a photon may be received in detection step 60 rather infrequently. However, in some embodiments, the quantity of photons received and/or probability of receiving a photon may be higher, as the techniques described herein are not limited to a low quantity of received photons.

Following step 56 the rejection step 52 and detection step 60 may be repeated n−1 times to obtain information (e.g., statistical information) regarding the time periods at which photons tend to arrive after a trigger event. Time-binned charge carriers may be aggregated in the bin as the detection step 60 is repeated. Repeating the detection step 60 may enable aggregating a sufficient number of charge carriers in the bin to provide statistically meaningful results. For example, in the context of fluorescence lifetime measurement, it may be expected that a photon absorption event in response to a photon received from a fluorophore may occur relatively rarely. For example, such an event may be expected to occur once in about 10,000 measurements. Accordingly, a large number of measurements (detection step 60) may need to be performed to aggregate a sufficient number of charge carriers in the bin such that the results are statistically meaningful and/or have a sufficient signal to noise ratio. In some embodiments, the number of measurements n of a fluorophore that may be performed for fluorescence lifetime measurement may be 50,000 or more, 100,000 or more, 200,000 or more, 300,000 or more, 400,000 or more 500,000 or more, one million or more, two million or more five million or more, to enable capturing and binning a sufficient number of charge carriers in each bin (i.e., tens or hundreds, or more, in some embodiments). The measurements may be repeated at a frequency in the MHz range, such as between 50 MHz and 100 MHz, between 25 MHz and 200 MHz, between 10 MHz and 500 MHz, or between 1 MHz and 500 MHz, all ranges being inclusive of endpoints, or at another frequency. In some embodiments, after the measurement is repeated n−1 times, about one hundred carriers (e.g., electrons) may be accumulated in the bin. However, this depends on the number of photons received. In some embodiments, the number of carriers accumulated in the bin may be between 10 and 10,000, such as between 50 and 1,000, or any other suitable number. Method 50 may be performed over any suitable time period in which photons are desired to be captured. The period over which method 50 is performed is termed a "frame." In the context of fluorescence lifetime measurement, a suitable length of a frame may be 10 milliseconds, for example. In some embodiments, a detection step 60 may be repeated at a frequency that is the MHz range. In some embodiments, the bin may have a resolution on the scale of picoseconds or nanoseconds.

Figure 4C:
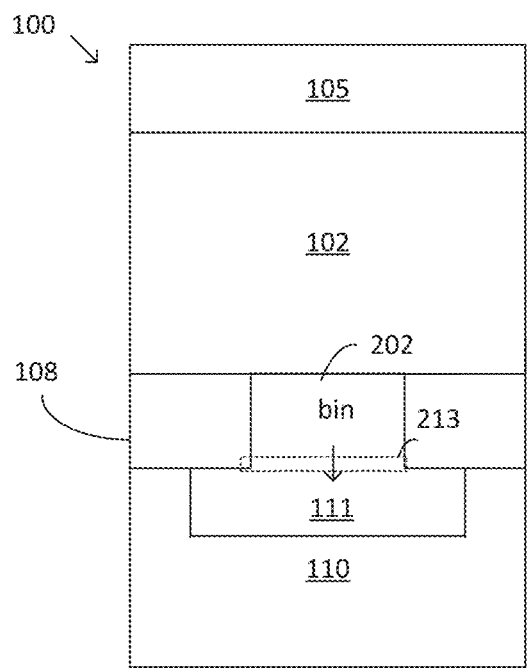
Figure 5:
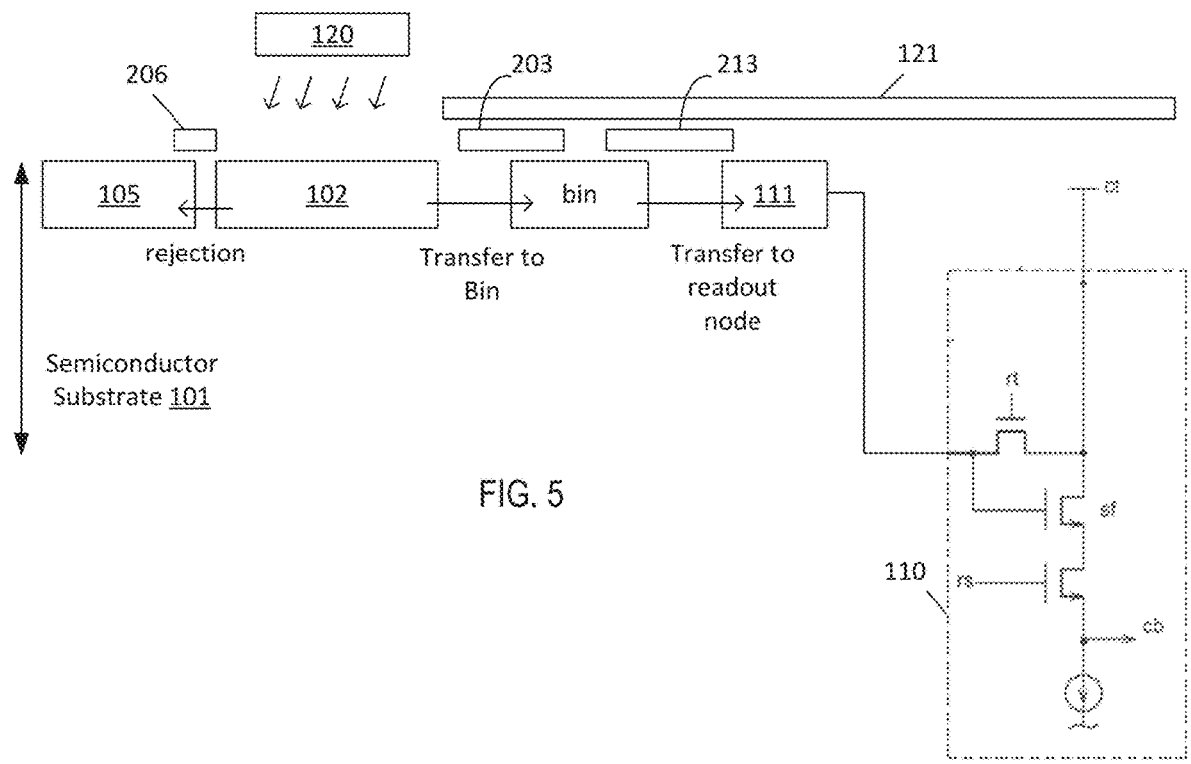
FIG. 5 shows a cross-sectional view of a direct binning pixel.

Once the allotted number n of measurements (step 60) has been performed, the method proceeds to step 58 of reading out the bin. In step 58, charge may be transferred from the bin to a readout node 111, which is another charge carrier storage region. The readout node 111 may include a floating diffusion. Alternatively, the bin may itself be a floating diffusion which is used for both charge storage and readout. In this case, 212/213 are absent and 111 is the bin. Transfer of charge from the bin to readout node 111 is illustrated in FIG. 4C. To transfer the charge from each bin, the voltage of electrode 213 may be changed to lower a potential barrier 212 between the bin and the readout node 111. A potential gradient may be established that causes the charge to flow from bin 0 to readout node 111. The charge transferred to readout node 111 may then be converted into a voltage and read out using readout circuitry 110, an example of which is shown in FIG. 5.

Varying Pixel Timing

In some embodiments, the pixel timing such as the timing of the rejection period (rejection step 52), the detection period (detection step 60) or both, is changed for different frames (i.e., respective instances of method 50). Changing the pixel timing can enable obtaining characteristics of light received by the pixel in different time periods. Changing the pixel timing can also allow a single time bin to capture information regarding photons received in different time periods with respect to a trigger event. In some embodiments, a first frame (a first instance of method 50) may be performed with a first pixel and then a second frame (a second instance of method 50) may be performed with a different pixel timing. In some embodiments, the timing is changed back and forth between two or more different pixel timings, as illustrated in FIG. 6A.

Figure 6A:
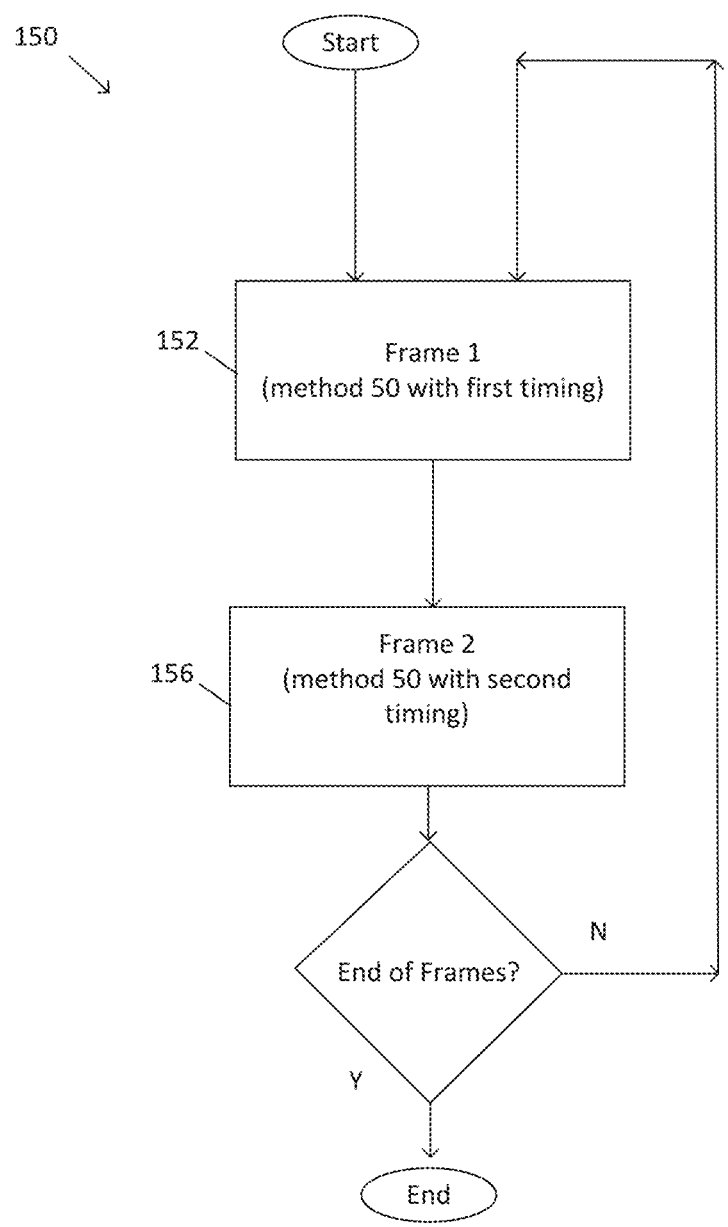
FIG. 6A shows a flowchart of a method 150 of operating pixel 100 that includes performing a plurality of alternating frames.

FIG. 6A shows a flowchart of a method 150 of operating pixel 100 that includes switching between different frames with different timings. Step 152 includes performing method 50 with a first pixel timing, or first frame. Then, the pixel timing is changed. Step 156 includes performing method 50 for a second pixel timing, or second frame. Steps 152 and 156 may repeated a plurality of times to capture information over a suitable time period (e.g., over the period of luminescence of a molecule during a reaction). Although FIG. 6A shows performing each frame once before alternating frames, in some embodiments a frame may be performed a plurality of times before switching to another frame. For example, the first frame may be performed a plurality of times (e.g., method 50 may be performed a plurality of times with the first timing) in step 152, then the detection period may be changed, and the second frame may be performed for a plurality of times (e.g., method 50 may be performed a plurality of times with the second timing). Additionally, although FIG. 6A shows performing two different frames, in some embodiments more than two frames may be performed in the sequence. For example, if three frames are performed, after frame two is performed in step 156 the pixel timing may be changed again and performed for a third frame, before returning to the first frame.

Figure 6B:
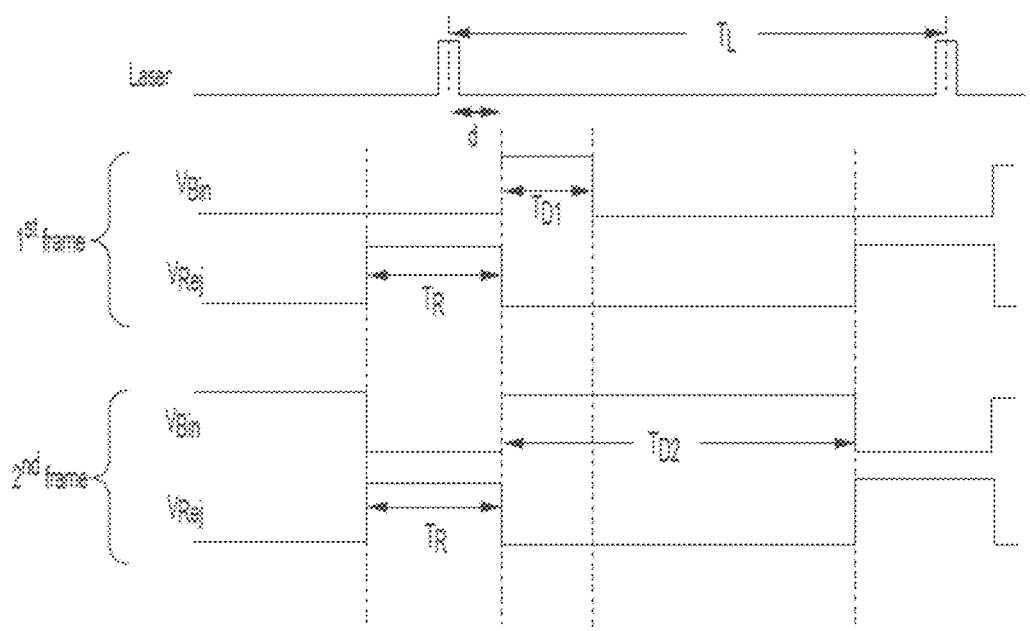
FIGS. 6B and 6C show timing diagrams for operating a pixel with different detection periods in different frames.

FIG. 6B illustrates an example of the timing of the rejection period (rejection step 52) and the detection period (detection step 60) for a first frame in which method 50 is performed with a first timing. The top plot in FIG. 6A shows the timing of trigger events, which may be excitation laser pulses. The laser pulses may be periodic with a period $T_L$. The second and third plots from the top illustrate the timing of steps 52 and 60, respectively during a first frame.

In this example, rejection step 52 includes setting the voltage $V_{Rej}$ of rejection electrode 206 to a high level. The rejection step 52 is shown to occur during a laser pulse. The time period of the rejection step, termed the rejection period $T_R$, is the time for which $V_{Rej}$ is high. The rejection period may begin before a laser pulse and end after a laser pulse to help ensure that unwanted carriers produced by the laser excitation light are discarded.

In this example, the detection step 60 begins with the setting the voltage $V_{Bin}$ of electrode 203 to a high level, which allows photogenerated charge to enter the bin. The delay between the laser pulse (e.g., the center time of the laser pulse) and the start of detection step 60 is shown as a delay time d. The voltage $V_{Rej}$ of electrode 206 may be set to a low level at the same time that the voltage $V_{Bin}$ of electrode 203 is set to a high level. In the first frame, the detection step 60 lasts for a detection period $T_{D1}$. Charge carriers produced in photodetection region 102 during this period are transferred to the bin. As one specific, non-limiting example, $T_{D1}$ may be two nanoseconds. At the end of the detection period the voltage $V_{Bin}$ of electrode 203 is set to a low level to prevent additional charge carriers from entering the bin. Charge carriers produced after the detection period are not transferred to the bin, and may be discarded during the next rejection step 52.

After repeating steps 52 and 60 n−1 times, the bin accumulates charge carriers received within the detection period $T_{D1}$ following n excitation laser pulses. The stored carriers can then be read out or transferred to a storage node. Since the timing shown for the first frame has the detection period relatively close in time to the excitation laser pulse, the charge carriers stored in the first frame are indicative of the photons that tend to be produced relatively soon after the excitation laser pulse, in this example.

Following the first frame, the timing is changed, and method 50 is performed for a second frame with a different timing. In this example the difference between the first frame and the second frame is that the detection period $T_{D2}$ is longer than detection period $T_{D1}$. Accordingly, the second frame can capture photogenerated charge carriers later in the period $T_L$. As one specific, non-limiting example, $T_{D2}$ may be seven nanoseconds.

After repeating steps 52 and 60 n−1 times, the bin stores charge carriers within the detection period $T_{D2}$ following an excitation laser pulse. The stored carriers can then be read out. Since the timing shown for the second frame has a longer duration than in the first frame, the charge carriers stored in the second frame are indicative of both the photons that tend to be produced relatively soon after the excitation laser pulse and photons that tend to be produced at later times, in this example.

FIG. 6B illustrates an example in which the rejection period timing (e.g., start time and duration) is the same for both the first and second frames, while the detection period timing with respect to the first and second frames is changed by changing the amount of time that $V_{Bin}$ is set to allow charge carriers to enter the bin, while keeping the start time of the detection period the same. However, the timing of the rejection period $T_R$ in the first frame need not be the same as the timing of rejection period $T_R$ in the second frame, as they may have different durations, start times and/or end times. In some embodiments, different timing characteristics may be changed between frames. Any combination of rejection period start time and/or end time, rejection period duration, detection period start time and/or end time and detection period duration may be changed in different frames.

Figure 6C:
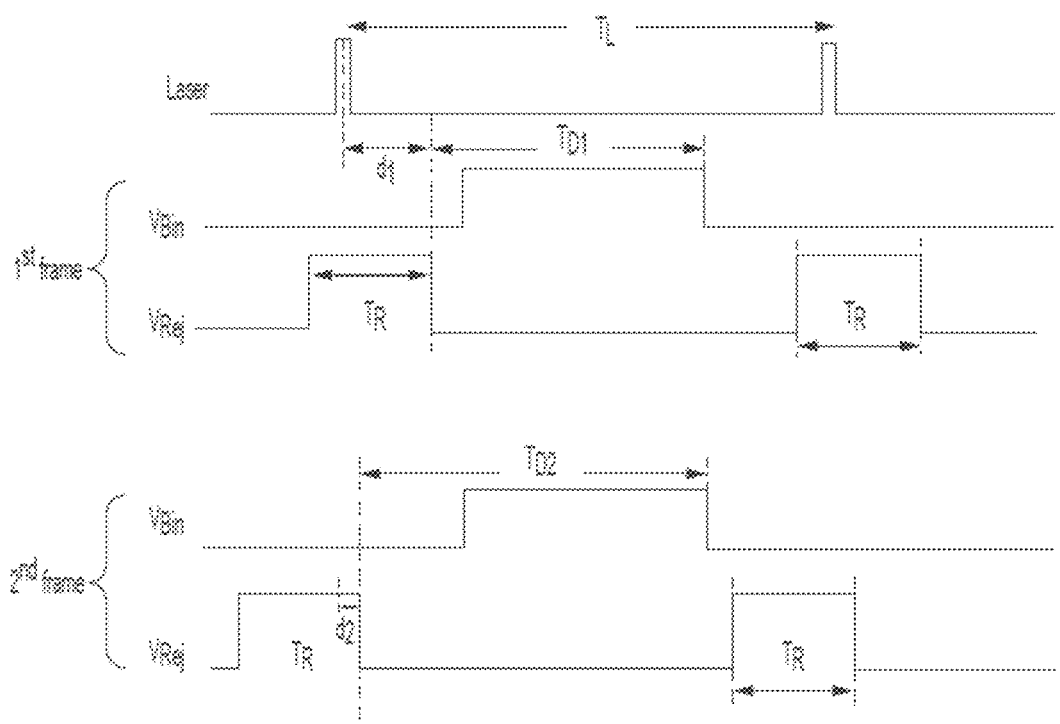

FIG. 6C shows another example of the timing for first and second frames. In this example (and in contrast to the example of FIG. 6B), the start time and end time of the rejection period is changed between the two frames. In the first frame, $V_{Rej}$ is set high for the rejection period $T_R$. In the second frame, $V_{Rej}$ is set high for a rejection period $T_R$ that begins earlier relative to the laser pulse. In this example, the duration of the rejection period $T_R$ in the first frame is the same as rejection period $T_R$ in the second frame. However, the duration of the rejection period $T_R$ in the first frame need not be the same as rejection period $T_R$ in the second frame, as they may have different durations. For example, the rejection period $T_R$ in the first frame may begin earlier than shown in FIG. 6C, in which case the rejection period $T_R$ in the first frame is longer than the rejection period $T_R$ in the second frame. After $V_{Rej}$ is set low, photogenerated charges can remain in the photodetection region, which occurs earlier in the second frame than in the first frame. Although the timing of $V_{Bin}$ is the same in both frames, the detection period $T_{D2}$ effectively begins earlier in the second frame than in the first frame since the rejection period ends earlier, and photogenerated charges can remain in the rejection region until $V_{Bin}$ goes high. The timing shown in FIG. 6C may have the advantage of reduced noise with respect to the timing shown in FIG. 6B since the detection period $T_{D1}$ in the first frame begins later than in the example of FIG. 6B, which reduces the likelihood that unwanted photogenerated charge carriers produced by the excitation pulse are transferred to the bin.

There are a number of different ways in which the timing may be different from the first frame to the second frame. For example, the delay time d, which is the delay between the laser pulse (e.g., the center time of the laser pulse) and the start of detection step 60, need not be the same in both frames, as in the example of FIG. 6B, and may be different, as in the example of FIG. 6C, which shows the second frame having a shorter delay time ($d_2$) than the delay time ($d_1$) of the first frame. Also, $T_{D2}$ need not extend the entire duration between the rejection periods, as it may extend only a portion of the duration between rejection periods, as illustrated in FIG. 6C. Further, the order of the frames may be reversed, with the second frame occurring before the first frame. The number of laser pulses per frame may be the same for the first frame and the second frame, or may be different in different types of frames. There may be differences between first and second frames other than those specifically described herein.

Having described varying the timing, the information collected by changing the timing will be described. The amount of charge stored in the bin during the first frame is termed $C_1$ and the amount of charge stored in the bin during the second frame is termed $C_2$. $C_1$ and $C_2$ indicate both an intensity characteristic and a temporal characteristic of the received light. There are a number of ways of processing $C_1$ and $C_2$ to obtain an intensity characteristic and a temporal characteristic. By way of example, $C_2$ may be representative of an intensity characteristic, or the sum of $C_1$ and $C_2$ may be representative of an intensity characteristic. Also by way of example, the ratio of $C_1$ and $C_2$ may be representative of a temporal characteristic. These examples are merely to illustrate the ways in which $C_1$ and $C_2$ represent timing and intensity characteristics. Although such characteristics may be calculated in the ways described, or using more complex calculations, it is not necessary to calculate timing or intensity characteristics. In some embodiments, a machine learning algorithm, such as a neural network, may be trained to distinguish between luminescent molecules based on the raw information $C_1$ and $C_2$ that includes inherent timing and intensity information. After it is trained, the algorithm may be used to identify and/or distinguish luminescent molecules based on the raw information $C_1$ and $C_2$. This information may be used to sequence a nucleic acid, for example.

Figure 7:
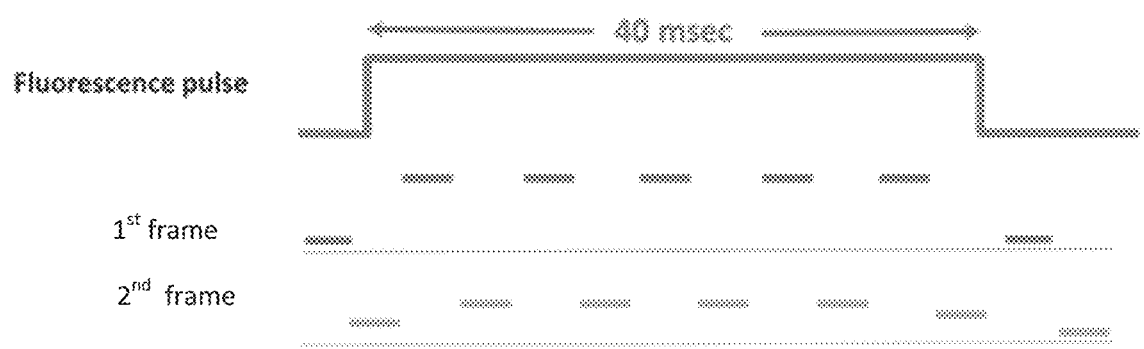
FIG. 7 shows a timing diagram illustrating switching between two frames.

FIG. 7 illustrates that method 50 may be performed a number of times, alternating between frame 1 and frame 2. FIG. 7 shows the timing of a fluorescence pulse that may occur during a nucleotide incorporation event. The levels shown for the two frames are values of $C_1$ and $C_2$, respectively. Average values for $C_1$ and $C_2$ may be calculated over a number of frames, using any suitable calculation (e.g., mean, median, etc.). The average values may be used to obtain intensity and/or time characteristics of the fluorescence pulse, and/or the raw average values may be used directly to identify and/or discriminate luminescent molecules. Although FIGS. 6 and 7 show an example in which two different timings are used (frame 1 and frame 2), any number of different timings may be used, such as two or more or three or more. For example, two frames, three frames or more may be used.

In some embodiments, the integrated device may be programmable to enable changing the timing of the bin. The electrodes may be controlled by a control circuit that sets a suitable timing and adjusts the timing between frames. In some embodiments, the timing for the time bin may be set based upon the timing of a trigger event that initiates a measurement period for a measurement 60. In the fluorescence lifetime measurement context, the timing for the time bin may be set in response to detecting the timing of an excitation pulse that excites a fluorophore. For example, when an excitation light pulse reaches the pixel 100, a surge of carriers may travel from the photon absorption/carrier generation region 102 to the drain. The accumulation of photogenerated carriers at the drain in response to the excitation pulse may cause a change in voltage of the drain. Accordingly, in some embodiments the excitation pulse may be detected by detecting the voltage of the drain. For example, a comparator may compare the voltage of the drain to a threshold, and may produce a pulse when the voltage of the drain exceeds the threshold. The timing of the pulse may be indicate the timing of the trigger event, and the timing of the time bin may be set based upon this timing. However, the techniques described herein are not limited in this respect, as any suitable technique may be used to detect the start of a measurement.

Having described the timing of operation of the pixel 100, the discussion now returns to the structure and readout of pixel 100. FIG. 5 shows a cross-sectional view of an example of pixel 100 along the line A-A' in FIG. 2. As illustrated, electrodes 206, 203 and 213 are formed on or over a semiconductor substrate 101. Light is received from a light source 120 at photon absorption/carrier generation area 102. Light source 120 may be any type of light source, including a luminescent sample (e.g., linked to a nucleic acid) or a region or scene to be imaged in imaging applications, by way of example and not limitation. Light source 120 may include unwanted excitation laser light. A light shield 121 may prevent light from reaching another portion of the substrate, for example to prevent charges from being generated directly in the bin or readout node by stray excitation light, or other stray light. Light shield 121 may be formed of any suitable material, such a metal layer of the integrated circuit, by way of example and not limitation. FIG. 5 illustrates the opposite direction of charge transfer during rejection (to the left) and transfer to the bin (right).

As illustrated in FIG. 5, pixel 100 may include readout circuitry 110 that allows reading out the charge stored in the bin. Pixel 100 may be an active pixel, such that readout circuitry 110 includes a readout amplifier, or a passive pixel in which readout circuitry 110 does not include a readout amplifier. Any suitable type of active pixel or passive pixel readout circuitry may be used. If readout circuitry 110 includes a readout amplifier, the readout amplifier may take the charge accumulated in a charge storage bin (e.g., bin 0, bin 1) as an input and produce a voltage representative of the charge in the charge storage bin as an output.

If readout circuitry 110 includes a readout amplifier, any suitable type of amplifier may be used. Examples of suitable amplifiers include amplifiers abased on a common source configuration and amplifiers abased on a source-follower configuration. One example of readout circuitry 110 based on a source-follower configuration is illustrated in FIG. 5. As shown in FIG. 5, readout region 110 may include a source follower buffer transistor sf, a reset transistor rt, and a row select transistor rs. However, the techniques described herein are not limited as to any particular amplifier configuration. In some embodiments, transfer electrode 213 may be part of readout circuitry 110.

Any suitable readout techniques may be used, including noise reduction techniques. In some embodiments, readout circuitry 110 may read out the bin using correlated double sampling. Correlated double sampling is technique in which a first sample may be taken of a node at a reset voltage level which includes an undetermined amount of noise, and a second sample may be taken of a signal level at the node including the same undetermined noise. The noise can be subtracted out by subtracting the sampled reset level from the sampled signal level.

Reading out the bin may include converting the amount of charge aggregated in the bin into a corresponding voltage, as discussed above. Readout from the time bin may be performed at any suitable rate, such as 50 Hz to 100 Hz, 10 Hz to 500 Hz, or another rate.

Transfer electrode 213 may be charge coupled to the bin. A readout node 111 may be charge coupled to the transfer electrode 213. As illustrated in FIG. 5, the readout node 111 may be connected to the source of the reset transistor rt. The drains of the reset transistor rt and row select transistor rs may be connected to a high voltage supply. The gates of the reset transistor rt and row select transistor rs may be controlled by a row driver circuit. In some embodiments, the source of the transistor sf may be connected to the drain of the row select transistor rs. The gate of transistor sf may be connected to the readout node 111. In some embodiments, the source of the source follower may be connected to the column line readout.

In some embodiments, a pixel need not have both a bin and a readout node 111. FIG. 8A shows a cross-sectional view of an example of pixel 200, in which the bin is formed by the readout node 111. The readout node 111 may be a floating diffusion, as discussed above. Using readout node 111 as the bin may simplify the pixel design and operation by eliminating a charge storage region and electrode 213. FIG. 8B shows a plan view of pixel 200. As seen in FIGS. 8A and 8B, in pixel 200 electrode 203 controls the potential barrier 202 to accessing the readout node 111. Operation of pixel 200 may be the same for that described above for pixel 100, with the exception that readout may be simplified by avoiding the need to transfer charge from a separate bin to readout node 111.

Example Storage Bins There are several ways to implement a charge storage bin as a potential well within the semiconductor region. In some embodiments, the potential well may be partially within the electrode 203. There are two types of transfer for moving charge in and out of the well. The accumulation transfer moves charge into the well. The readout transfer moves charge out of the well.

The following are possible characteristics of the potential well:

- The well may be of sufficient depth to store accumulated charge of at least 100 electrons for 10 ms at 30° C.
- The electrode 203 charge couples region 102 to the well.
- The well may be at least partially within the electrode 203.
- The well may be at higher potential during accumulation transfer than the full depletion voltage of region 102.
- The well's full depletion voltage may be at lower potential than the floating diffusion reset level during readout transfer.
- The well's potential may be dynamically modulated in order to serve both the requirements of accumulation transfer and readout transfer.

There are a number of techniques to create the potential well for a bin, such as bin 0 or bin 1. As one example, one or more of electrodes 203 and 213 and may be complementary-doped (split-doped). A second option is to place a buried channel n-type implant at the well location that is modulated by the electrode. When the electrode is at high potential the well potential increases beyond the collection region. A third option is to produce a replica diode that is the same as the diode of region 102. The diode may be a buried diode, as with the diode of region 102, that has the same implants. It may be formed between the barrier 202 and the transfer electrode 213. The depletion voltage may be adjusted with n-type implant that extends across the readout transfer gate. The electrode forming barrier 202 may be doped N+ while the readout transfer electrode may be doped P+. In some embodiments, a combination of the above-described techniques may be used to form the potential well for a bin.

The position of a bin may be under an electrode, in a region not covered by the electrode, or both under an electrode and in a region not covered by an electrode. For example, the bin may be under electrode 203, in the region not under electrode 203 between electrode 203 and the polysilicon transfer electrode connected to t1, or both under electrode 203 and in a region not under electrode 203.

Example of Materials

Figure 9:
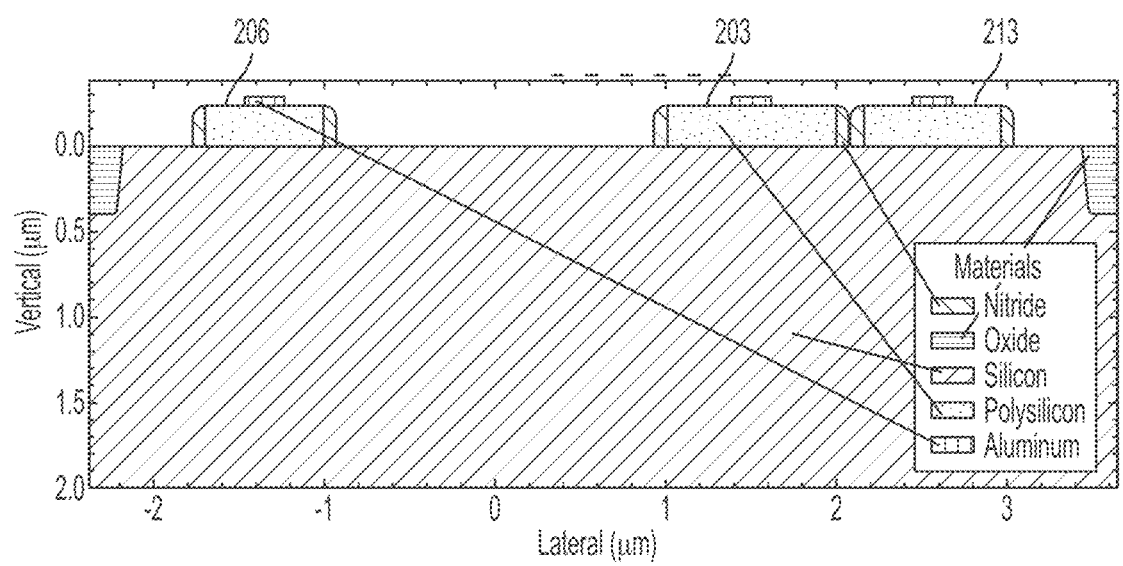
FIG. 9 shows examples of materials from which the integrated circuit may be fabricated.

FIG. 9 shows examples of materials from which the integrated circuit may be fabricated. A pixel may be formed in a semiconductor region, which in some embodiments may be silicon. Insulating regions, such as silicon oxide regions, may insulate areas of the integrated circuit from one another. The electrodes (e.g., electrodes 206, 203 and 213) may be formed of polysilicon or another conductor. Insulating spacers may be positioned at the sides of the electrodes. For example, the insulating regions may be formed of silicon nitride. A metal such as aluminum may be disposed on the electrodes to make electrical contact thereto. However, other materials may be used, as the devices described herein are not limited as to particular materials.

Figure 10:
Figure 11:
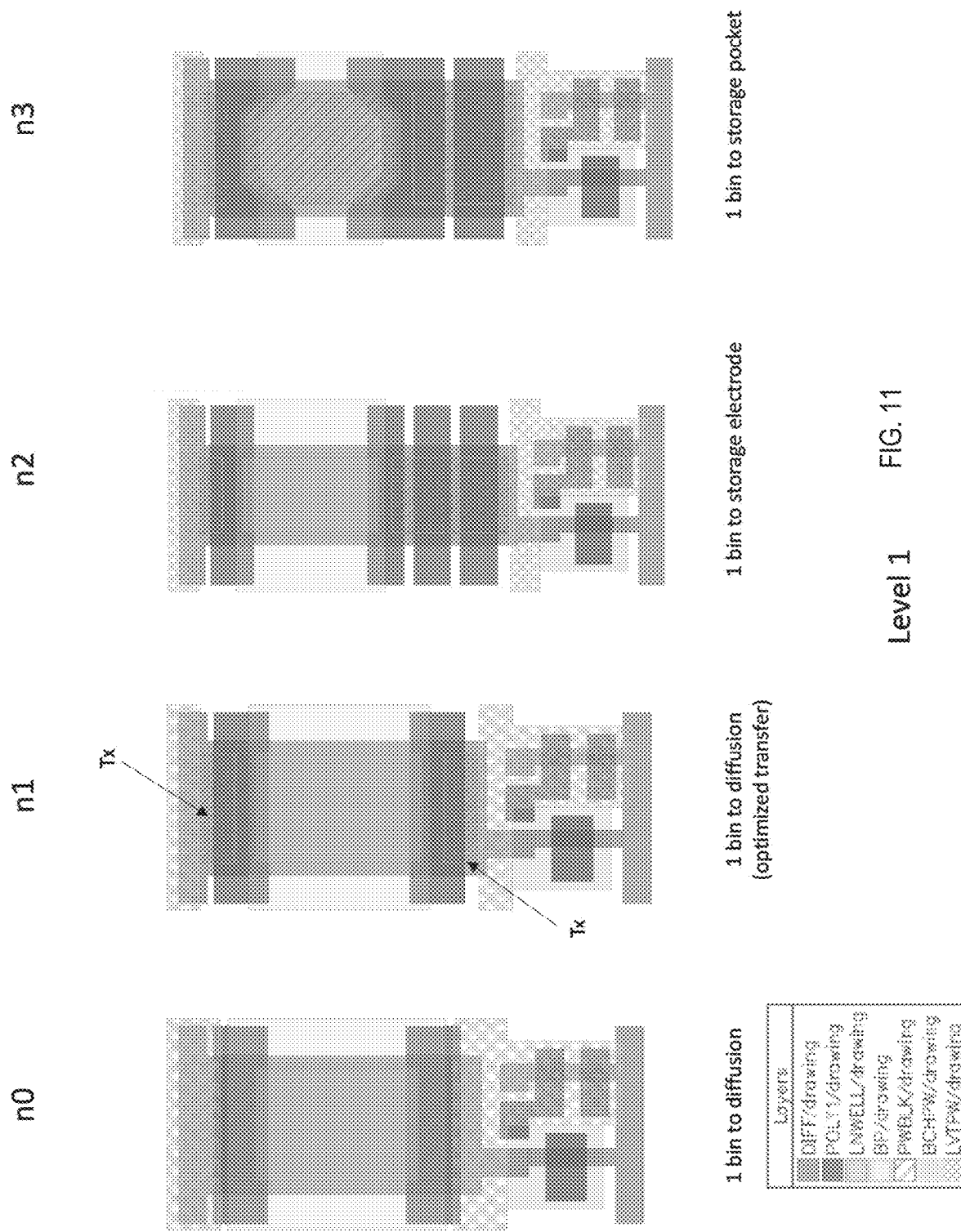
Figure 12:
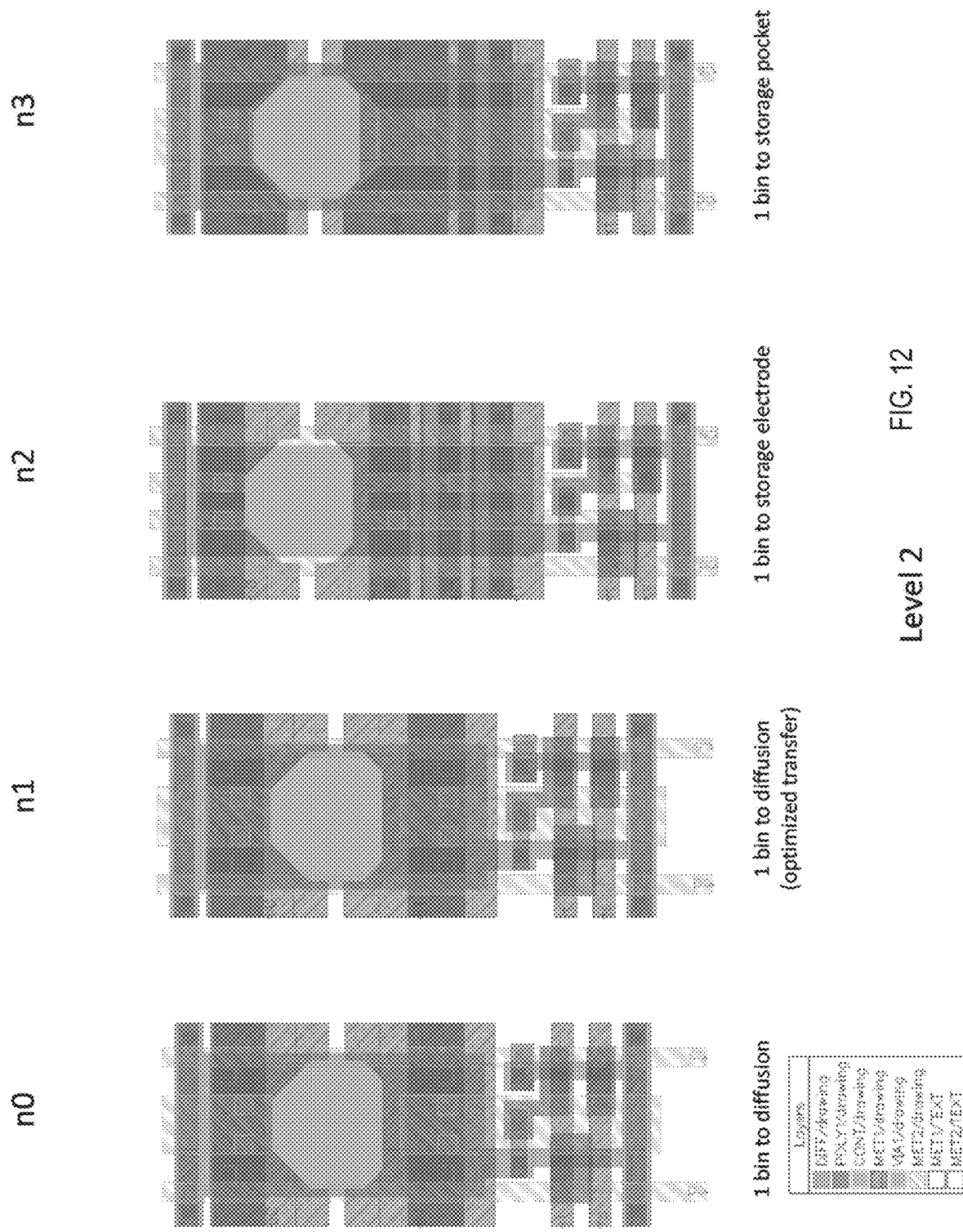
Figure 13:
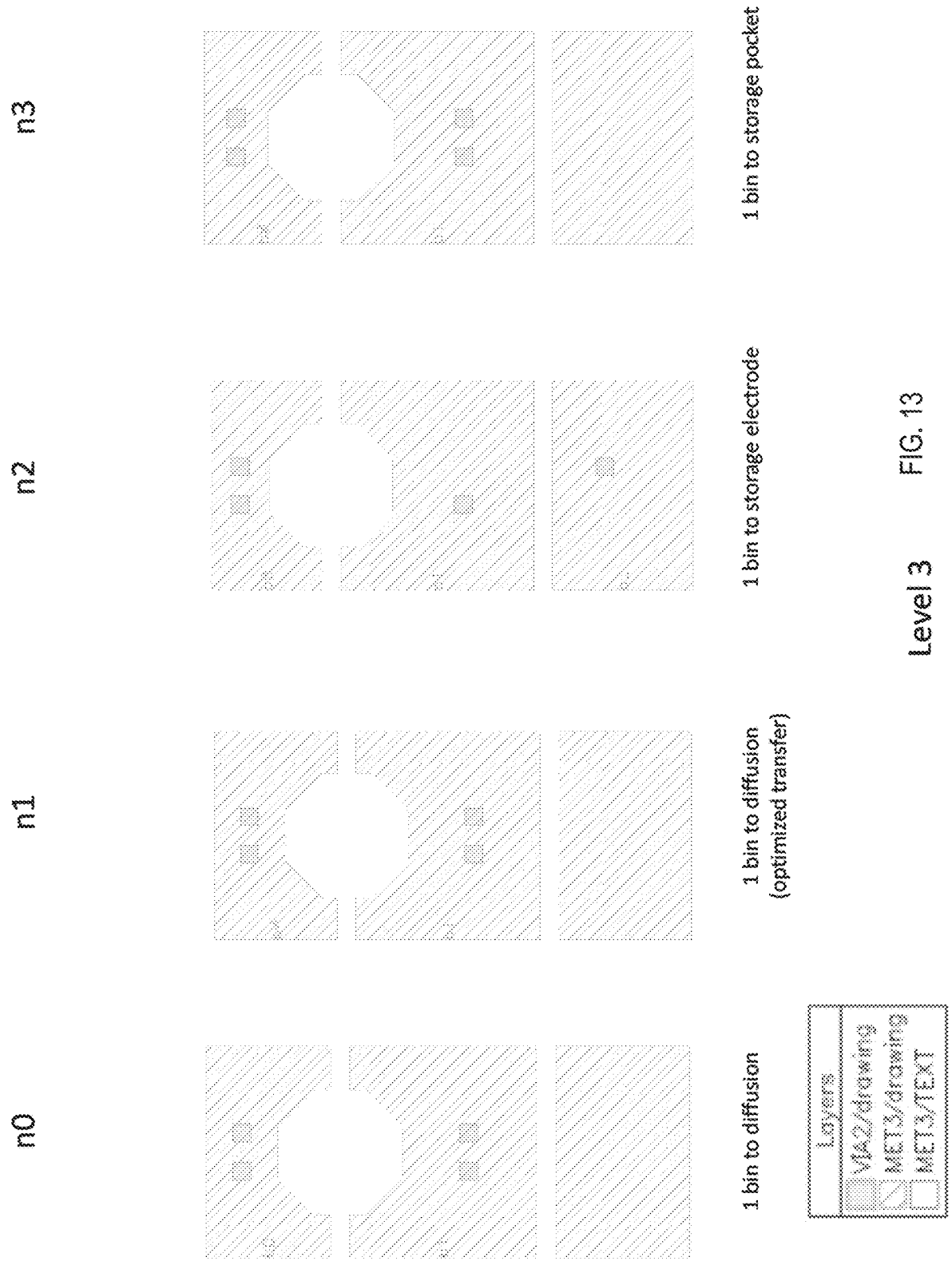
Figure 15:
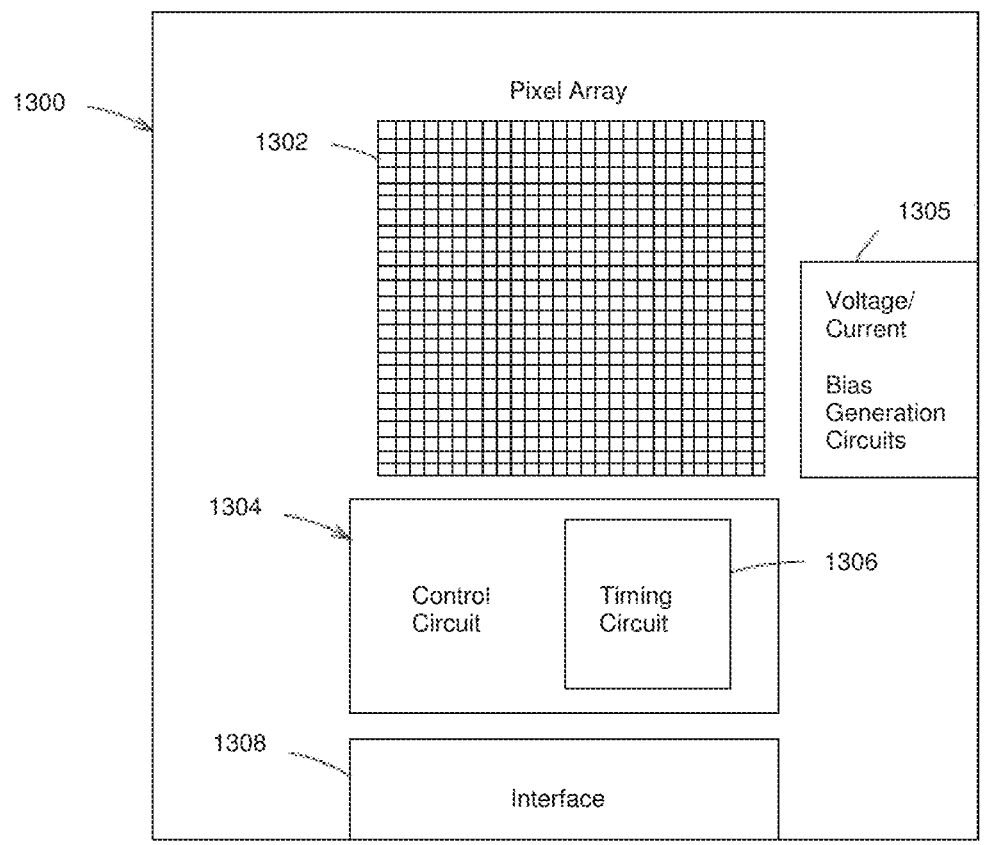
FIG. 15 shows a diagram of a chip architecture.

Example Integrated Circuit Realization and Method of Forming the Integrated Photodetector In some embodiments, the chip 1300 in FIG. 15 may be formed in a silicon substrate using a standard CMOS (Complementary Metal Oxide Semiconductor) process. However, the techniques described herein are not limited in this respect, as any suitable substrate or fabrication process may be used. FIGS. 10-14 show an exemplary process of forming the photodetector and four different pixel designs n0-n3. FIG. 10 shows Level 0 with diffusion and N-well regions in the semiconductor region, and an overlying poly electrode layer. FIG. 11 shows Level 1, FIG. 12 shows a Level 2, FIG. 13 shows Level 3 and FIG. 14 shows Level 4.

Pixel Array/Chip Architecture

FIG. 15 shows a diagram of the chip architecture, according to some embodiments. As shown in FIG. 15, an integrated circuit or chip 1300 may include a pixel array 1302 including a plurality of pixels 100, a control circuit 1304 that includes a timing circuit 1306, voltage/current bias generation circuits 1305 and an interface 1308. However, not all of these components need be on the chip 1300, as one or more components may be off-chip. For example, in some embodiments control signals for the pixel electrodes may be generated by a circuit located off-chip.

Pixel array 1302 includes an array of pixels 100 laid out in any suitable pattern, such as a rectangular pattern, for example. The pixel array 1302 may have any suitable number of pixels. The pixel array may have row and/or column conductors for reading out rows or columns of the pixel array 1302. Pixels may be read out in parallel, in series, or a combination thereof. For example, in some embodiments a row of pixels may be read out in parallel, and each row of the pixel array may be read out sequentially. However, the techniques described herein are not limited in this respect, as the pixels may be read out in any suitable manner.

The pixel array 1302 is controlled by a control circuit 1304. Control circuit 1304 may be any suitable type of control circuit for controlling operations on the chip 1300, including operations of the pixel array 1302. In some embodiments, control circuit 1304 may include a microprocessor programmed to control operations of the pixel array 1302 and any other operations on the chip 1300. The control circuit may include a computer readable medium (e.g., memory) storing computer readable instructions (e.g., code) for causing the microprocessor performing such operations. For example, the control circuit 1304 may control producing voltages to be applied to electrodes of the charge carrier segregation structure(s) in each pixel. The control circuit 1304 may change the voltages of one or more electrodes, as discussed above, to capture carriers, transfer carriers, and to perform readout of pixels and the array. The control circuit may set the timing of operations of the charge carrier segregation structure based on a stored timing scheme. The stored timing scheme may be fixed, programmable and/or adaptive, as discussed above.

The control circuit 1304 may include a timing circuit 1306 for timing operations of the charge carrier segregation structure(s) of the pixels or other operations of the chip. In some embodiments, timing circuit 1306 may enable producing signals to precisely control the timing of voltage changes in the charge carrier segregation structure(s) to accurately time bin charge carriers. In some embodiments the timing circuit 1306 may include an external reference clock and/or a delay-locked loop (DLL) for precisely setting the timing of the signals provided to the charge carrier segregation structure(s). In some embodiments, two single-ended delay lines may be used, each with half the number of stages aligned 180-degrees out of phase. However, any suitable technique may be used for controlling the timing of signals on the chip.

The chip 1300 may include an interface 1308 for sending signals from the chip 1300, receiving signals at the chip 1300, or both. The interface 1308 may enable reading out the signals sensed by the pixel array 1302. Readout from the chip 1300 may be performed using an analog interface and/or a digital interface. If readout from the chip 1300 is performed using a digital interface, the chip 1300 may have one or more analog to digital converters for converting signals read out from the pixel array 1302 into digital signals. In some embodiments, the readout circuit may include a Programmable Gain Amplifier. One or more control signals may be provided to the chip 1300 from an external source via interface 1308. For example, such control signals may control the type of measurements to be performed, which may include setting the timing of the time bin.

Analysis of signals read out from the pixel array 1302 may be performed by circuitry on-chip or off-chip. For example, in the context of fluorescence lifetime measurement, analysis of the timing of photon arrival may include approximating a fluorescence lifetime of a fluorophore. Any suitable type of analysis may be performed. If analysis of signals read out from the pixel array 1302 is performed on-chip, chip 1300 may have any suitable processing circuitry for performing the analysis. For example, chip 1300 may have a microprocessor for performing analysis that is part of or separate from control circuit 1304. If analysis is performed on-chip, in some embodiments the result of the analysis may be sent to an external device or otherwise provided off-chip through interface 1308. In some embodiments all or a portion of the analysis may be performed off-chip. If analysis is performed off-chip, the signals read out from the pixel array 1302 and/or the result of any analysis performed by the chip 1300, may be provided to an external device through interface 1308.

In some embodiments, the chip 1300 may include one or more of the following:
1) on-chip, digitally controlled, pixel bias generators (DACs).
2) on-chip, digitally programmable gain amplifiers that convert the single-ended pixel output voltage signal to a differential signal and applies gain to the signal
3) digitally-controlled amplifier bias generators that allow scaling the power dissipation with the output rate.

Figure 16:
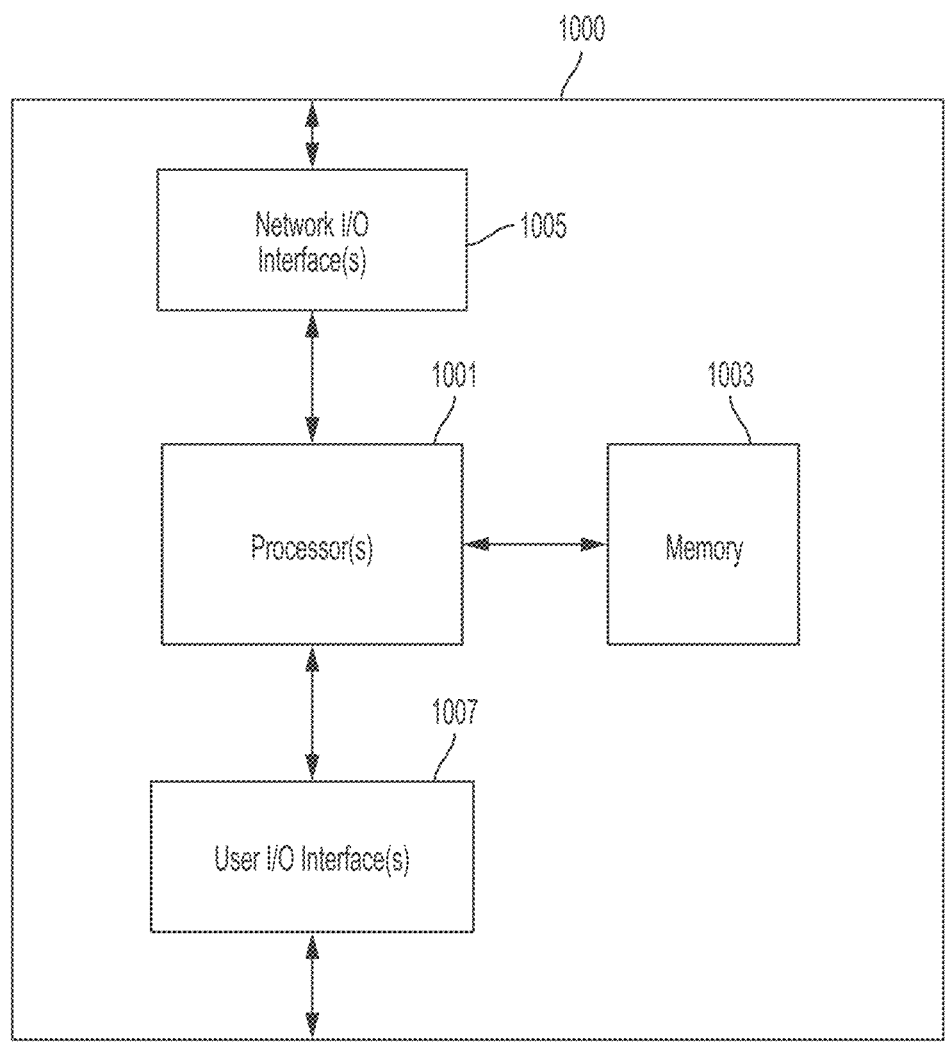
FIG. 16 is a block diagram of an illustrative computing device.

FIG. 16 is a block diagram of an illustrative computing device 1000 that may be used to implement a control circuit for controlling the pixel array or for performing analysis of the data from the pixels. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Additional Applications

Although the integrated photodetector described herein may be applied to the analysis of a plurality of biological and/or chemical samples, as discussed above, the integrated photodetector may be applied to other applications, such as imaging applications, for example. In some embodiments, the integrated photodetector may include a pixel array that performs imaging of a region, object or scene, and may detect temporal characteristics of the light received at individual pixels from different regions of the region, object or scene. For example, in some embodiments the integrated photodetector may perform imaging of tissue based on the temporal characteristics of light received from the tissue, which may enable a physician performing a procedure (e.g., surgery) to identify an abnormal or diseased region of tissue (e.g., cancerous or pre-cancerous). In some embodiments, the integrated photodetector may be incorporated into a medical device, such as a surgical imaging tool. In some embodiments, time-domain information regarding the light emitted by tissue in response to a excitation light pulse may be obtained to image and/or characterize the tissue. For example, imaging and/or characterization of tissue or other objects may be performed using fluorescence lifetime imaging.

Although the integrated photodetector may be applied in a scientific or diagnostic context such as by performing imaging or analysis of biological and/or chemical samples, or imaging tissue, as described above, such an integrated photodetector may be used in any other suitable contexts. For example, in some embodiments, such an integrated photodetector may image a scene using temporal characteristics of the light detected in individual pixels. An example of an application for imaging a scene is range imaging or time-of-flight imaging, in which the amount of time light takes to reach the photodetector is analyzed to determine the distance traveled by the light to the photodetector. Such a technique may be used to perform three-dimensional imaging of a scene. For example, a scene may be illuminated with a light pulse emitted from a known location relative to the integrated photodetector, and the reflected light detected by the photodetector. The amount of time that the light takes to reach the integrated photodetector at respective pixels of the array is measured to determine the distance(s) light traveled from respective portions of the scene to reach respective pixels of the photodetector. In some embodiments, the integrated photodetector may be incorporated into a consumer electronic device such as a camera, cellular telephone, or tablet computer, for example, to enable such devices to capture and process images or video based on the range information obtained.

In some embodiments, the integrated photodetector described in the present application may be used to measure low light intensities. Such a photodetector may be suitable for applications that require photodetectors with a high sensitivity, such as applications that may currently use single photon counting techniques, for example. However, the techniques described herein are not limited in this respect, as the integrated photodetector described in the present applications may measure any suitable light intensities.

Additional Luminescence Lifetime Applications

Imaging and Characterization Using Lifetimes

As mentioned above, the techniques described herein are not limited to labeling, detection and quantitation using exogenous fluorophores. In some embodiments, a region, object or sample may be imaged and/or characterized using fluorescence lifetime imaging techniques though use of an integrated photodetector. In such techniques, the fluorescence characteristics of the region, object or sample itself may be used for imaging and/or characterization. Either exogenous markers or endogenous markers may be detected through lifetime imaging and/or characterization. Exogenous markers attached to a probe may be provided to the region, object, or sample in order to detect the presence and/or location of a particular target component. The exogenous marker may serve as a tag and/or reporter as part of a labeled probe to detect portions of the region, object, or sample that contains a target for the labeled probe. Autofluorescence of endogenous markers may provide a label-free and noninvasive contrast for spatial resolution that can be readily utilized for imaging without requiring the introduction of endogenous markers. For example, autofluorescence signals from biological tissue may depend on and be indicative of the biochemical and structural composition of the tissue.

Fluorescence lifetime measurements may provide a quantitative measure of the conditions surrounding the fluorophore. The quantitative measure of the conditions may be in addition to detection or contrast. The fluorescence lifetime for a fluorophore may depend on the surrounding environment for the fluorophore, such as pH or temperature, and a change in the value of the fluorescence lifetime may indicate a change in the environment surrounding the fluorophore. As an example, fluorescence lifetime imaging may map changes in local environments of a sample, such as in biological tissue (e.g., a tissue section or surgical resection). Fluorescence lifetime measurements of autofluorescence of endogenous fluorophores may be used to detect physical and metabolic changes in the tissue. As examples, changes in tissue architecture, morphology, oxygenation, pH, vascularity, cell structure and/or cell metabolic state may be detected by measuring autofluorescence from the sample and determining a lifetime from the measured autofluorescence. Such methods may be used in clinical applications, such as screening, image-guided biopsies or surgeries, and/or endoscopy. In some embodiments, an integrated photodetector of the present application may be incorporated into a clinical tool, such as a surgical instrument, for example, to perform fluorescence lifetime imaging. Determining fluorescence lifetimes based on measured autofluorescence provides clinical value as a label-free imaging method that allows a clinician to quickly screen tissue and detect small cancers and/or pre-cancerous lesions that are not apparent to the naked eye. Fluorescence lifetime imaging may be used for detection and delineation of malignant cells or tissue, such as tumors or cancer cells which emit luminescence having a longer fluorescence lifetime than healthy tissue. For example, fluorescence lifetime imaging may be used for detecting cancers on optically accessible tissue, such as gastrointestinal tract, bladder, skin, or tissue surface exposed during surgery.

In some embodiments, fluorescence lifetimes may be used for microscopy techniques to provide contrast between different types or states of samples. Fluorescence lifetime imaging microscopy (FLIM) may be performed by exciting a sample with a light pulse, detecting the fluorescence signal as it decays to determine a lifetime, and mapping the decay time in the resulting image. In such microscopy images, the pixel values in the image may be based on the fluorescence lifetime determined for each pixel in the photodetector collecting the field of view.

Imaging a Scene or Object Using Temporal Information

As discussed above, an integrated photodetector as described in the present application may be used in scientific and clinical contexts in which the timing of light emitted may be used to detect, quantify, and or image a region, object or sample. However, the techniques described herein are not limited to scientific and clinical applications, as the integrated photodetector may be used in any imaging application that may take advantage of temporal information regarding the time of arrival of incident photons. An example of an application is time-of-flight imaging.

Time-of-Flight Applications

In some embodiments, an integrated photodetector may be used in imaging techniques that are based on measuring a time profile of scattered or reflected light, including time-of-flight measurements. In such time-of-flight measurements, a light pulse may be emitted into a region or sample and scattered light may be detected by the integrated photodetector. The scattered or reflected light may have a distinct time profile that may indicate characteristics of the region or sample. Backscattered light by the sample may be detected and resolved by their time of flight in the sample. Such a time profile may be a temporal point spread function (TPSF). The time profile may be acquired by measuring the integrated intensity over multiple time periods after the light pulse is emitted. Repetitions of light pulses and accumulating the scattered light may be performed at a certain rate to ensure that all the previous TPSF is completely extinguished before generating a subsequent light pulse. Time-resolved diffuse optical imaging methods may include spectroscopic diffuse optical tomography where the light pulse may be infrared light in order to image at a further depth in the sample. Such time-resolved diffuse optical imaging methods may be used to detect tumors in an organism or in part of an organism, such as a person's head.

Additionally or alternatively, time-of-flight measurements may be used to measure distance or a distance range based on the speed of light and time between an emitted light pulse and detecting light reflected from an object. Such time-of-flight techniques may be used in a variety of applications including cameras, proximity detection sensors in automobiles, human-machine interfaces, robotics and other applications that may use three-dimensional information collected by such techniques.

Additional Aspects

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of ordinal terms is also not intended to preclude additional elements. For example, recitation of a "first" and "second" element does not preclude presence of a "third" element or additional elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An integrated circuit, comprising:
   a photodetection region configured to receive incident photons, the photodetection region being configured to produce a plurality of charge carriers in response to the incident photons; and
   a charge carrier storage region,
   wherein the integrated circuit is configured to:
   (A) aggregate first photogenerated charge carriers in the charge carrier storage region over a plurality of first detection periods following first respective trigger events, the plurality of first detection periods individually having a first timing with respect to the first respective trigger events;
   (B) read out a first signal indicative of charge stored in the charge carrier storage region following (A);
   (C) aggregate second photogenerated charge carriers in the charge carrier storage region over a plurality of second detection periods following second respective trigger events, the plurality of second detection periods individually having a second timing with respect to the second respective trigger events; and
   (D) read out a second signal indicative of charge stored in the charge carrier storage region following (C),
   wherein the integrated circuit is configured to repeat at least (A) through (D) a plurality of times, and wherein the charge carrier storage region is a single charge carrier storage region.

2. The integrated circuit of claim 1, wherein the plurality of first detection periods have different start times, end times and/or durations than the plurality of second detection periods.

3. The integrated circuit of claim 1, wherein the integrated circuit is configured to calculate an average value of the first signal and an average value of the second signal based on the first signals and second signals read out from repeating (A) through (D) the plurality of times.

4. The integrated circuit of claim 3, wherein the integrated circuit is configured to identify at least a portion of a molecule based at least in part on the average value of the first signal and the average value of the second signal.

5. The integrated circuit of claim 1, wherein the integrated circuit is further configured to:
   (E) aggregate third photogenerated charge carriers in the charge carrier storage region over a plurality of third detection periods following respective third trigger events, the plurality of third detection periods individually having a third timing with respect to the respective third trigger events; and
   (F) read out a third signal indicative of charge stored in the charge carrier storage region following (E),
   wherein the integrated circuit is configured to repeat at least (A) through (F) a plurality of times.

6. The integrated circuit of claim 1, wherein a pixel comprises the single charge carrier storage region and a second charge carrier storage region that receives charge from the single charge carrier storage region.

7. A photodetection method, comprising:
   (A) aggregating first photogenerated charge carriers in a charge carrier storage region over a plurality of first detection periods following first respective trigger events, the plurality of first detection periods individually having a first timing with respect to the first respective trigger events;
   (B) reading out a first signal indicative of charge stored in the charge carrier storage region following (A);
   (C) aggregating second photogenerated charge carriers in the charge carrier storage region over a plurality of second detection periods following second respective trigger events, the plurality of second detection periods individually having a second timing with respect to the second respective trigger events;
   (D) reading out a second signal indicative of charge stored in the charge carrier storage region following (C); and
   (E) repeating at least (A) through (D) a plurality of times,
   wherein the charge carrier storage region is a single charge carrier storage region.

* * * * *